US010927855B2

(12) United States Patent
Arikawa

(10) Patent No.: US 10,927,855 B2
(45) Date of Patent: Feb. 23, 2021

(54) ACCUMULATOR

(71) Applicant: Eagle Industry Co., Ltd., Tokyo (JP)

(72) Inventor: Tatsuhiro Arikawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/480,653

(22) PCT Filed: Jan. 24, 2018

(86) PCT No.: PCT/JP2018/002111
§ 371 (c)(1),
(2) Date: Jul. 24, 2019

(87) PCT Pub. No.: WO2018/143030
PCT Pub. Date: Aug. 9, 2018

(65) Prior Publication Data

US 2019/0360503 A1 Nov. 28, 2019

(30) Foreign Application Priority Data

Feb. 3, 2017 (JP) ............................ JP2017-018944

(51) Int. Cl.
*F16L 55/04* (2006.01)
*F15B 1/14* (2006.01)
*F15B 1/10* (2006.01)

(52) U.S. Cl.
CPC ................ *F15B 1/14* (2013.01); *F15B 1/103* (2013.01); *F15B 2201/205* (2013.01);
(Continued)

(58) Field of Classification Search
CPC .... F15B 1/14; F15B 1/103; F15B 1/10; F15B 2201/20; F15B 1/106; F15B 20/007; F15B 2201/3153; F15B 2201/41
(Continued)

(56) References Cited

U.S. PATENT DOCUMENTS 3,456,673 A * 7/1969 Legrand .................. F15B 1/265
137/202
3,675,684 A 7/1972 Mercier et al. ................. 138/30
(Continued)

FOREIGN PATENT DOCUMENTS

CN 103842661 6/2014
CN 103998792 8/2014
(Continued)

OTHER PUBLICATIONS

International Search Report and Written Opinion (w/translations) issued in application No. PCT/JP2018/002111, dated Apr. 3, 2018 (10 pgs).

(Continued)

*Primary Examiner* — James F Hook
(74) *Attorney, Agent, or Firm* — Hayes Soloway P.C.

(57) ABSTRACT

An accumulator includes a housing having a sealing face and a fluid inlet/outlet passage, a bellows fixed at least one end to the housing such that an inner space of the housing is hermetically partitioned by the bellows into an interior and an exterior of the bellows, the bellows including a bellows main body capable of expanding and contracting and a bellows cap including an annular seal holder, and a sealing member formed by covering a disc-shaped substrate with an elastic body that is opposed to and capable of being closely attached to the sealing face of the housing, the sealing member is held by a holding portion of the annular seal holder on an inner diameter side of the annular seal holder, the fluid inlet/outlet passage of the housing being closed upon a close attachment of the elastic body to the sealing face.

20 Claims, 14 Drawing Sheets

(52) U.S. Cl.
CPC . *F15B 2201/3153* (2013.01); *F15B 2201/405* (2013.01); *F15B 2201/411* (2013.01)

(58) Field of Classification Search
USPC ....................................................... 138/30, 31
See application file for complete search history.

(56) References Cited

U.S. PATENT DOCUMENTS

| | | | | |
|---|---|---|---|---|
| 4,234,017 | A | 11/1980 | Mercier | 138/30 |
| 4,287,916 | A | 9/1981 | Sugimura et al. | 138/30 |
| 4,492,013 | A | 1/1985 | Porel | 138/30 |
| 4,526,205 | A | 7/1985 | Sugimura et al. | 138/30 |
| 5,215,124 | A | 6/1993 | Hattori et al. | 138/30 |
| 7,810,522 | B1 | 10/2010 | Nakoka et al. | 138/31 |
| 9,027,600 | B2 | 5/2015 | Yamashita | F16L 55/053 |
| 9,188,139 | B2 | 11/2015 | Yoshihara | F15B 1/08 |
| 9,328,746 | B2 | 5/2016 | Hyodo et al. | F15B 1/103 |
| 9,377,031 | B2 * | 6/2016 | Miyake | F15B 1/103 |
| 10,077,787 | B2 | 9/2018 | Arikawa | F15B 1/103 |
| 10,465,718 | B2 * | 11/2019 | Arikawa | F15B 1/106 |
| 10,480,539 | B2 * | 11/2019 | Arikawa | F15B 1/103 |
| 2003/0116209 | A1 * | 6/2003 | Umetsu | F15B 1/103 138/31 |
| 2011/0226370 | A1 * | 9/2011 | Arikawa | F15B 20/00 138/30 |
| 2012/0006438 | A1 * | 1/2012 | Nakaoka | F15B 1/103 138/30 |
| 2014/0311604 | A1 | 10/2014 | Yoshihara | F15B 1/08 |
| 2015/0204357 | A1 | 7/2015 | Hyodo et al. | F15B 1/103 |
| 2015/0240839 | A1 * | 8/2015 | Mizukami | F16L 55/053 138/31 |
| 2018/0306210 | A1 * | 10/2018 | Arikawa | F15B 1/103 |
| 2019/0360503 | A1 * | 11/2019 | Arikawa | F15B 1/14 |
| 2019/0368513 | A1 * | 12/2019 | Arikawa | F15B 1/103 |

FOREIGN PATENT DOCUMENTS

| | | | |
|---|---|---|---|
| CN | 104583606 | 4/2015 | |
| CN | 106030121 | 10/2016 | |
| JP | 2000249101 | 9/2000 | |
| JP | 2002155901 | 5/2002 | |
| JP | 2003222101 | 8/2003 | |
| JP | 2006010005 | 1/2006 | F15B 1/08 |
| JP | 2007092782 | 4/2007 | |
| JP | 3148349 | 2/2009 | |
| JP | 2009236137 | 10/2009 | F15B 1/24 |
| JP | 4384942 | 12/2009 | F15B 1/08 |
| JP | 2012097829 | 5/2012 | |
| JP | 2015158223 | 9/2015 | |
| WO | WO2013187165 | 12/2013 | F15B 1/08 |

OTHER PUBLICATIONS

International Preliminary Report on Patentability issued in application No. PCT/JP2018/002111, dated Aug. 15, 2019 (6 pgs).
International Preliminary Report on Patentability issued in application No. PCT/JP2018/002400, dated Aug. 15, 2019 (8 pgs).
International Search Report (w/translation) and Written Opinion (w/machine translation) issued in application No. PCT/JP2018/002400, dated Apr. 10, 2018 (12 pgs).
International Preliminary Report on Patentability issued in application No. PCT/JP2018/002399, dated Aug. 15, 2019 (7 pgs).
International Search Report (w/translation) and Written Opinion (w/machine translation) issued in application No. PCT/JP2018/002399, dated Apr. 10, 2018 (12 pgs).
Chinese Office Action (w/translation) issued in application No. 201880008446.5, dated Jan. 2, 2020 (12 pgs).
Chinese Office Action (w/translation) issued in application No. 201880008446.5, dated Jul. 16, 2020 (14 pgs).
Office Action issued in U.S. Appl. No. 16/480,473, dated Aug. 6, 2020, 32 pages.
Office Action issued in U.S. Appl. No. 16/477,157, dated Sep. 4, 2020, 24 pages.
U.S. Appl. No. 16/477,157, filed Jul. 10, 2019, Arikawa.
U.S. Appl. No. 16/480,473, filed Jul. 24, 2019, Arikawa.
European Search report issued in related European Application 18748030.6, dated Oct. 20, 2020 (8 pages).
European Search report issued in related European Application 18748451.4, dated Oct. 27, 2020 (7 pages).
Chinese Official Action issued in related Chinese Application 201880008542.X, dated Nov. 23, 2020 (10 pages).

* cited by examiner (a)

(b)

(a)

(b)

(a)

(b)

(a)

(b)

(a)

(b)

(a)

(b)

(a)

(b)

(a)

(b)

(a)

(b)

ACCUMULATOR

TECHNICAL FIELD

The present invention relates to an accumulator used in an automobile hydraulic system, an industrial equipment hydraulic system, etc., as a pressure storage device, a pulsation damper, etc.

BACKGROUND ART

In a hydraulic circuit of a hydraulic control device for an automobile, an industrial equipment, etc., an accumulator for performing pressure storage, pulsation damping (buffering), etc. is provided. In such an accumulator, a bellows is arranged in a housing, the bellows is formed by a bellows main body whose fixed end is welded and fixed to the housing, and a bellows cap attached to the other end of the bellows main body, and by the bellows main body and the bellows cap, an internal space of the housing is partitioned into a gas chamber in which a gas is enclosed, and a liquid chamber communicating with a fluid inlet/outlet passage which is connected to the hydraulic circuit in a sealed state. In the bellows, upon receiving a liquid flowing into the liquid chamber from the hydraulic circuit via the fluid inlet/outlet passage, the bellows main body is expandable and contracted so as to balance gas pressure in the gas chamber and liquid pressure in the liquid chamber, so that a pressure storage operation, a pulsation damping operation, etc. is performed (refer to Patent Citation 1).

On the outer face side (liquid chamber side) of the bellows cap of the bellows, a sealing member formed by a substrate which is made by a metal disc plate and an elastic member that covers a surface of the substrate is held by an annular seal holder. By this, for example, in accordance with discharge of the liquid stored in the liquid chamber, the bellows is expandable by the gas pressure in the bellows, and the sealing member is closely attached to a sealing face of a partition wall provided in the liquid chamber. Thereby, it is possible to close through holes projecting on the sealing face of the partition wall and communicating with the fluid inlet/outlet passage. Therefore, by locking part of the liquid in the liquid chamber, it is possible to balance the liquid pressure in the liquid chamber and the gas pressure in the gas chamber. Thus, it is possible to prevent breakage, etc. of the bellows.

However, in a case of fire, etc. in an automobile, a facility, etc. provided with such an accumulator, by the elastic member of the sealing member being melt and burnt out due to a high temperature and the exposed substrate being abutted with the sealing face of the partition wall, the through holes communicating with the fluid inlet/outlet passage are closed, and the gas pressure in the bellows is radically increased and the liquid in the liquid chamber is expanded due to a high temperature. Thus, there is a risk that the housing is broken.

In the accumulator disclosed in Patent Citation 1, by providing recesses and projections on the surface of the substrate forming the sealing member, even in a case where the elastic member of the sealing member is melt and burnt out due to a high temperature of fire, etc. and the exposed substrate is abutted with the sealing face of the partition wall, a pressure releasing flow passage communicating with the fluid inlet/outlet passage is formed by a gap formed between the recesses and the projections on the surface of the substrate and the sealing face of the partition wall. By utilizing this pressure releasing flow passage to release the liquid in the liquid chamber and the gas in the bellows from the fluid inlet/outlet passage, the housing is not easily broken.

CITATION LIST

Patent Literature

Patent Citation 1: JP 4384942 (Page 3, FIG. 1)

SUMMARY OF INVENTION

Technical Problem

However, in Patent Citation 1, the recesses and the projections are provided in the substrate forming the sealing member in order to form the pressure releasing flow passage described above. Thus, due to the recesses and the projections, the elastic member is non-uniformly bonded to the substrate in Manufacture of the sealing member. In a case where the gas pressure in the gas chamber is repeatedly received by the sealing member in a state where the sealing member is closely attached to the sealing face at steady operation, local stress is applied to the recesses and the projections and the elastic member is easily detached from the substrate. Thus, there is a problem that the life of the accumulator is shortened.

The present invention is achieved focusing on such a problem, and an object thereof is to provide an accumulator whose life is long without specifically processing a sealing member.

Solution to Problem

In order to solve the foregoing problem, an accumulator according to a first aspect of the present invention includes: a housing having a sealing face and a fluid inlet/outlet passage; a bellows fixed at least one end to the housing such that an inner space of the housing is hermetically partitioned by the bellows into an interior and an exterior of the bellows, the bellows including a bellows main body capable of expanding and contracting and a bellows cap including an annular seal holder; and a sealing member formed by covering a disc-shaped substrate with an elastic body that is opposed to and capable of being closely attached to the sealing face of the housing, the sealing member is held by a holding portion of the annular seal holder on an inner diameter side of the annular seal holder, the fluid inlet/outlet passage of the housing being closed upon a close attachment of the elastic body to the sealing face, wherein a through hole passing through in a radial direction is provided in the seal holder, and a communication passage extending in the radial direction so as to partially form a space providing communication between the through hole and the fluid inlet/outlet passage is provided in the seal holder or the sealing face. According to the first aspect, in a state where the elastic member of the sealing member is melt and burnt out due to a high temperature of fire, etc. and the exposed substrate is abutted with an upper face of the holding portion of the seal holder or the sealing face, it is possible to form a pressure releasing flow passage to release the fluid flowing in from the through hole provided in the seal holder to the fluid inlet/outlet passage through the space formed by the communication passage which is provided in the seal holder or the sealing face. Thus, it is possible to extend the life of the accumulator without specifically processing the sealing member.

In the accumulator according to a second aspect of the present invention, a plurality of the through holes and a plurality of the communication passages are provided in the circumferential direction.

According to the second aspect, a plurality of the through holes and a plurality of the communication passages forming the pressure releasing flow passage are provided in the circumferential direction. Thus, it is possible to ensure a flow rate of the pressure releasing flow passage, and to release the fluid to the fluid inlet/outlet passage for a short time.

In the accumulator according to a third aspect of the present invention, the through hole and the communication passage are aligned in the radial direction.

According to the third aspect, the through hole and the communication passage are closed aligned in the seal holder. Thereby, it is possible to let the fluid efficiently flow to the fluid inlet/outlet passage by the pressure releasing flow passage.

In the accumulator according to a fourth aspect of the present invention, the substrate has a diameter larger than an inner diameter of the holding portion of the seal holder, and the communication passage is a communication recess portion provided on an upper face of the holding portion of the seal holder and, extending more than the substrate outward in the radial direction.

According to the fourth aspect, in a state where the elastic member of the sealing member is melt and burnt out due to a high temperature of fire, etc. and the exposed substrate is abutted with the upper face of the holding portion of the seal holder, it is possible to form a pressure releasing flow passage to release the fluid flowing in from the through hole provided in the seal holder to the fluid inlet/outlet passage from the outer diameter side of the communication recess portion provided on the upper face of the holding portion of the seal holder through a space formed by the communication recess portion. Thus, it is possible to extend the life of the accumulator without specifically processing the sealing member.

In the accumulator according to a fifth aspect of the present invention, the substrate has a diameter smaller than an inner diameter of the holding portion of the seal holder, and the communication passage is a communication recess portion provided on the sealing face.

According to the fifth aspect, in a state where the elastic member of the sealing member is melt and burnt out due to a high temperature of fire, etc. and the exposed substrate is abutted with the sealing face, it is possible to form a pressure releasing flow passage to release the fluid flowing in from the through hole provided in the seal holder to the fluid inlet/outlet passage through a space formed by the communication recess portion which is provided on the sealing face. Thus, it is possible to extend the life of the accumulator without specifically processing the sealing member.

In the accumulator according to a sixth aspect of the present invention, a sealing portion where the sealing member and the sealing face are closely attached to each other is formed on a radially inward side of the communication recess portion.

According to the sixth aspect, the sealing portion where the sealing member aid the sealing face are closely attached to each other is formed on the inner diameter side of the communication recess portion. Thus, at steady operation, the fluid flowing in from the through hole provided in the seal holder is not released to the fluid inlet/outlet passage through the space formed by the communication recess portion.

In the accumulator according to a seventh aspect of the present invention, the seal holder is formed in an upward substantially-U shape in a sectional view, and having a standing portion on the radially inward side of the substantially-U shape that holds the sealing member, the substrate has a diameter larger than an inner diameter of the standing portion of the seal holder, and the communication passage is a communication hole passing through the standing portion of the seal holder in the radial direction.

According to the seventh aspect, in a state where the elastic member of the sealing member is melt and burnt out due to a high temperature of fire, etc. and the exposed substrate abutted with an upper end of the standing portion of the seal holder, it is possible to form a pressure releasing flow passage to release the fluid flowing in from the through hole provided in the seal holder to the fluid inlet/outlet passage through a space formed by the communication hole which is provided in the standing portion of the seal holder. Thus, it is possible to extend the life of the accumulator without specifically processing the sealing member.

In the accumulator according to an eighth aspect of the present invention, the fluid inlet/outlet passage has an opening portion formed in a funnel shape gradually spreading toward an open end thereof.

According to the eighth aspect, in a state where the elastic member of the sealing member is melt and burnt out due to a high temperature of fire, etc. and the opening portion of the fluid inlet/outlet passage is covered by the exposed substrate, and even in a case where the substrate is warped to the fluid inlet/outlet passage side due to a high temperature, etc., by the funnel shape, the opening portion of the fluid inlet/outlet passage is not easily closed.

In the accumulator according to a ninth aspect of the present invention, a groove portion extending along an inclined portion of the funnel shape of the fluid inlet/outlet passage is provided.

According to the ninth aspect, in a state where the elastic member of the sealing member is melt and burnt out due to a high temperature of fire, etc. and the opening portion of the fluid inlet/outlet passage is covered by the exposed substrate, and even in a case where the opening portion of the fluid inlet/outlet passage is substantially closed by the warped substrate, it is possible to release the fluid to the fluid inlet/outlet passage through the groove portion.

Further, as another mode, the substrate has a diameter larger than an inner diameter of the holding portion of the seal holder and the communication passage is provided with a communication recess portion formed by cutting out the holding portion of the seal holder in the up and down direction, the communication recess portion extending more than the substrate outward in the radial direction.

According to this mode, by cutting out the holding portion from the upper face to a lower face in the up and down direction, it is possible to ensure a large space from the substrate.

On the lower face of the holding portion of the seal holder, a communication recess portion extending over the radial direction is provided.

According to this mode, two types of communication recess portions are formed. Thus, it is possible to reliably release the fluid.

The housing includes the sealing face formed on the outer diameter side of the fluid inlet/outlet passage, and an annular face portion formed on the outer diameter side and below the sealing face, and a communication recess portion extending over the radial direction provided in the annular face portion.

According to this mode, two types of communication recess portions are formed. Thus, it is possible to reliably release the fluid.

The communication recess portion on the upper face of the holding portion of the seal holder is formed to be inclined downward from the outer diameter side to the inner diameter side.

An annular recess portion recessed upward is formed on the outer diameter of and on a lower face of the substrate.

The substrate is formed to have thickness on the outer diameter side less than thickness on the inner diameter side.

BRIEF DESCRIPTION OF DRAWINGS

FIG. 5A is a partial sectional view showing a state where the sealing member and the sealing face are closely attached to each other; and FIG. 5B is a partial sectional view showing a state where the rubber-like elastic body forming the sealing member is melt and burnt out and a pressure releasing flow passage is formed.

FIG. 6A is a partial sectional view showing a state where the sealing member and the sealing face are closely attached to each other; and FIG. 6B is a partial sectional view showing a state where the rubber-like elastic body forming the sealing member is melt and burnt out and a pressure releasing flow passage is formed.

FIG. 7A is a partial sectional view showing a state where the sealing member and the sealing face are closely attached to each other; and FIG. 7B is a partial sectional view showing a state where the rubber-like elastic body forming the sealing member is melt and burnt out and a pressure releasing flow passage is formed.

FIG. 8A is a partial sectional view showing a state where the sealing member and a sealing face are closely attached to each other; and FIG. 8B is a partial sectional view showing a state where the rubber-like elastic body forming the sealing member is melt and burnt out and a pressure releasing flow passage is formed.

FIG. 9A is a partial sectional view showing a state where the sealing member and a sealing face are closely attached to each other; and FIG. 9B is a partial sectional view showing a state where the rubber-like elastic body forming the sealing member is melt and burnt out and a pressure releasing flow passage is formed.

FIG. 10A is a partial sectional view showing a state where a sealing member and the sealing face are closely attached to each other; and FIG. 10B is a partial sectional view showing a state where a rubber-like elastic body forming the sealing member is melt and burnt out and a pressure releasing flow passage is formed.

FIG. 11A is a partial sectional view showing a state where a sealing member and a sealing face are closely attached to each other; and FIG. 11B is a partial sectional view showing a state where a rubber-like elastic body forming the sealing member is melt and burnt out and a pressure releasing flow passage is formed.

FIG. 12A is a partial sectional view showing a state where the sealing member and the sealing face are closely attached to each other; and FIG. 12B is a partial sectional view showing a state where the rubber-like elastic body forming the sealing member is melt and burnt out and a pressure releasing flow passage is formed.

FIG. 13A is a partial sectional view showing a state where the sealing member and a sealing face are closely attached to each other; and FIG. 13B is a partial sectional view showing a state where the rubber-like elastic body forming the sealing member is melt and burnt out and a pressure releasing flow passage is formed.

DESCRIPTION OF EMBODIMENTS

Modes for carrying out the accumulator according to the present invention will be described below based on embodiments.

First Embodiment

An accumulator according to a first embodiment of the present invention will be described with reference to FIGS. 1 to 4. Hereinafter, the near side of the paper plane of FIG. 1 will serve as the front face side (front side) of the accumulator, and description will be given with the up and down direction (also referred to as an axial direction) and the left and right direction (also referred to as a radial direction) when seen from the front side as a standard.

An accumulator 1 is used in, for example, an automobile hydraulic system, an industrial equipment hydraulic system, etc., as a pressure storage device, a pulsation damper, etc. The accumulator 1 is a metal bellows type accumulator in which a metal bellows is used as a bellows main body.

Figure 1:
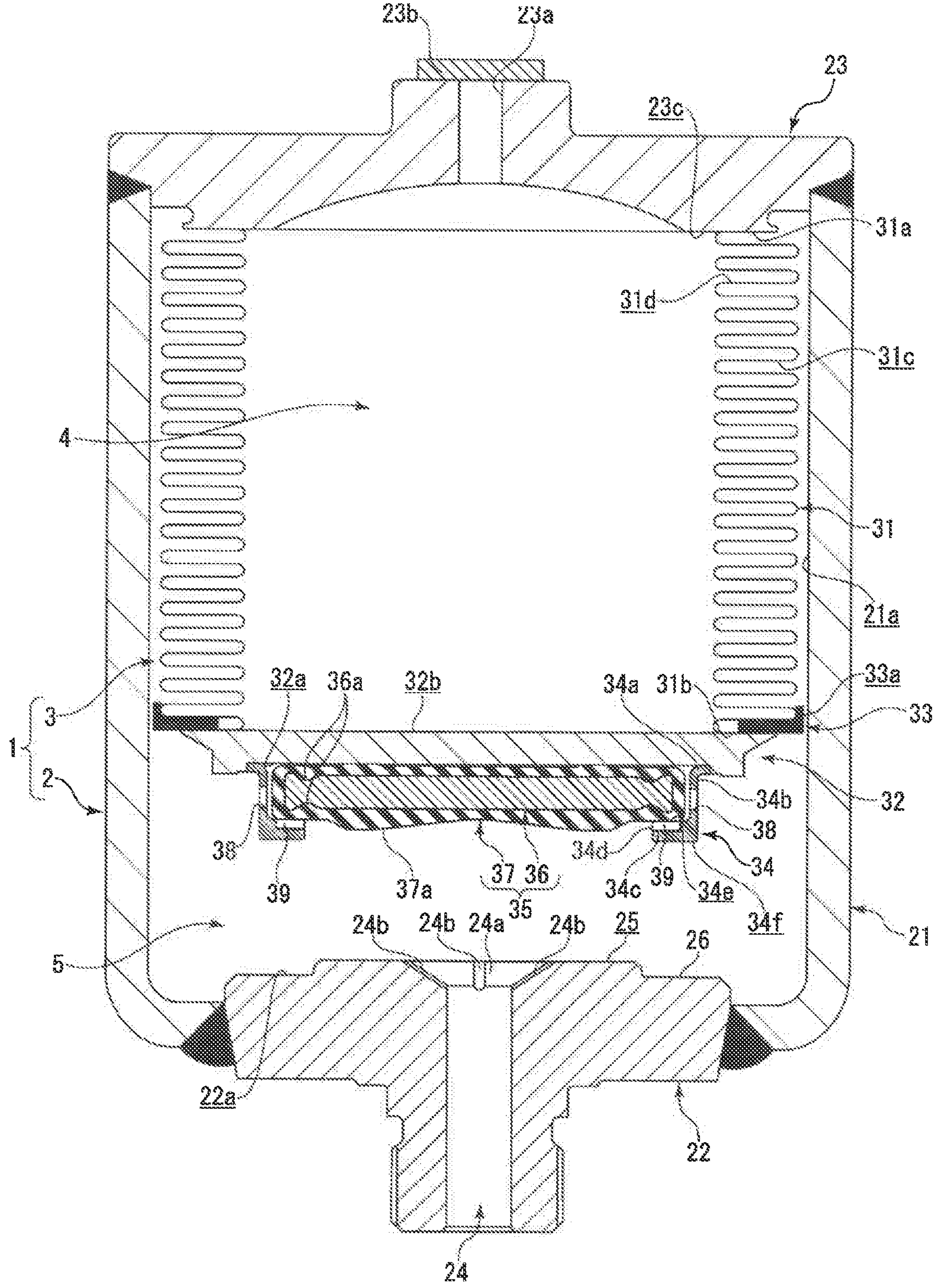
FIG. 1 is a sectional view showing a structure of an accumulator according to a first embodiment of the present invention.

As shown in FIG. 1, the accumulator 1 includes a housing 2 and a bellows 3 housed in the housing 2. FIG. 1 shows a state where the bellows main body 31 to be described later is contracted by pressure of a stored liquid, etc.

The housing 2 includes a cylindrical shell 21, an oil port member 22 welded and fixed so as to close a lower end of the shell 21, and a gas enclosing member 23 welded and fixed so as to close an upper end of the shell 21.

The gas enclosing member 23 is provided with a gas enclosing port 23*a* for charging high-pressure gas (for example, nitrogen gas) to a gas chamber 4 (described later)

formed in the housing 2. The gas enclosing port 23*a* is closed by a gas plug 23*b* after charging the high-pressure gas.

The oil port member 22 is provided with a fluid inlet/outlet passage 24 for letting a liquid (for example, working oil) flow into and out of a pressure pipe (not shown) in the housing 2. In the fluid inlet/outlet passage 24, an opening portion 24*a* of the fluid inlet/outlet passage 24 is formed in a funnel shape gradually spreading upward, and a plurality of groove portions 24*b*, 24*b*, extending along inclination of the funnel shape are formed.

The oil port member 22 is provided with an annular sealing face 25 formed on the outer diameter side of the opening portion 24*a* of the fluid inlet/outlet passage 24. Further, on the outer diameter side of the sealing face 25, an annular face portion 26 is provided with a position lower than the sealing face 25.

The bellows 3 comprises a metal bellows main body 31 formed in a substantially cylindrical shape, and a metal bellows cap 32 formed in a disc shape.

The bellows main body 31 is welded and fixed to an inner face 23*c* of the gas enclosing member 23 so as to close a fixed end 31*a* forming an upper end, and welded and fixed to an upper face 32*b* of the bellows cap 32 so as to close a playing end 31*b* forming a lower end in a state where an annular protection ring 33 is sandwiched inbetween.

The protection ring 33 protects the bellows main body 31 so that the bellows main body 31 is not brought into direct contact with an inner wall face 21*a* of the shell 21. An outer circumferential face 33*a* of the protection ring 33 and the inner wall face 21*a* of the shell 21 are slightly separated from each other in the radial direction, and hence the protection ring 33 is capable of smoothly sliding without preventing extension and contraction operations of the bellows 3.

An annular seal holder 34 formed in a crank shape in a sectional view is fitted to a lower face 32*a* of the bellows cap 32. A disc-shaped sealing member 35 is attached and fixed to the seal holder 34.

The sealing member 35 is formed by attaching (vulcanization bonding) a rubber-like elastic body 37 (elastic member) to a part or all of a surface of a disc-shaped metal substrate 36. Structures of the seal holder 34 and the sealing member 35 will be described in detail later.

An internal space of the housing 2 is partitioned by the bellows 3 (the bellows main body 31 and the bellows cap 32) into the gas chamber 4 communicating with the gas enclosing port 23*a* and a liquid chamber 5 communicating with the fluid inlet/outlet passage 24 in a sealed state.

The gas chamber 4 is defined by the inner face 23*c* of the gas enclosing member 23, an inner circumferential face 31*d* of the bellows main body 31, and the upper face 32*b* of the bellows cap 32. The high-pressure gas charged from the gas enclosing port 23*a* is enclosed in the gas chamber.

The liquid chamber 5 is defined by the inner wall face 21*a* of the shell 21, an inner face 22*a* of the oil port member 22, an outer circumferential face 31*c* of the bellows main body 31, and the lower face 32*a* of the bellows cap 32 (the seal holder 34, the sealing member 35). The liquid flows into and out of the pressure pipe via the fluid inlet/outlet passage 24.

The accumulator 1 adjusts a liquid pressure in such a manner that the bellows cap 32 is moved to a certain position and the gas pressure of the gas chamber 4, and the liquid pressure of the liquid chamber 5 are balanced by the expantion and contraction operations of the bellows 3 provided in the housing 2.

Figure 2:
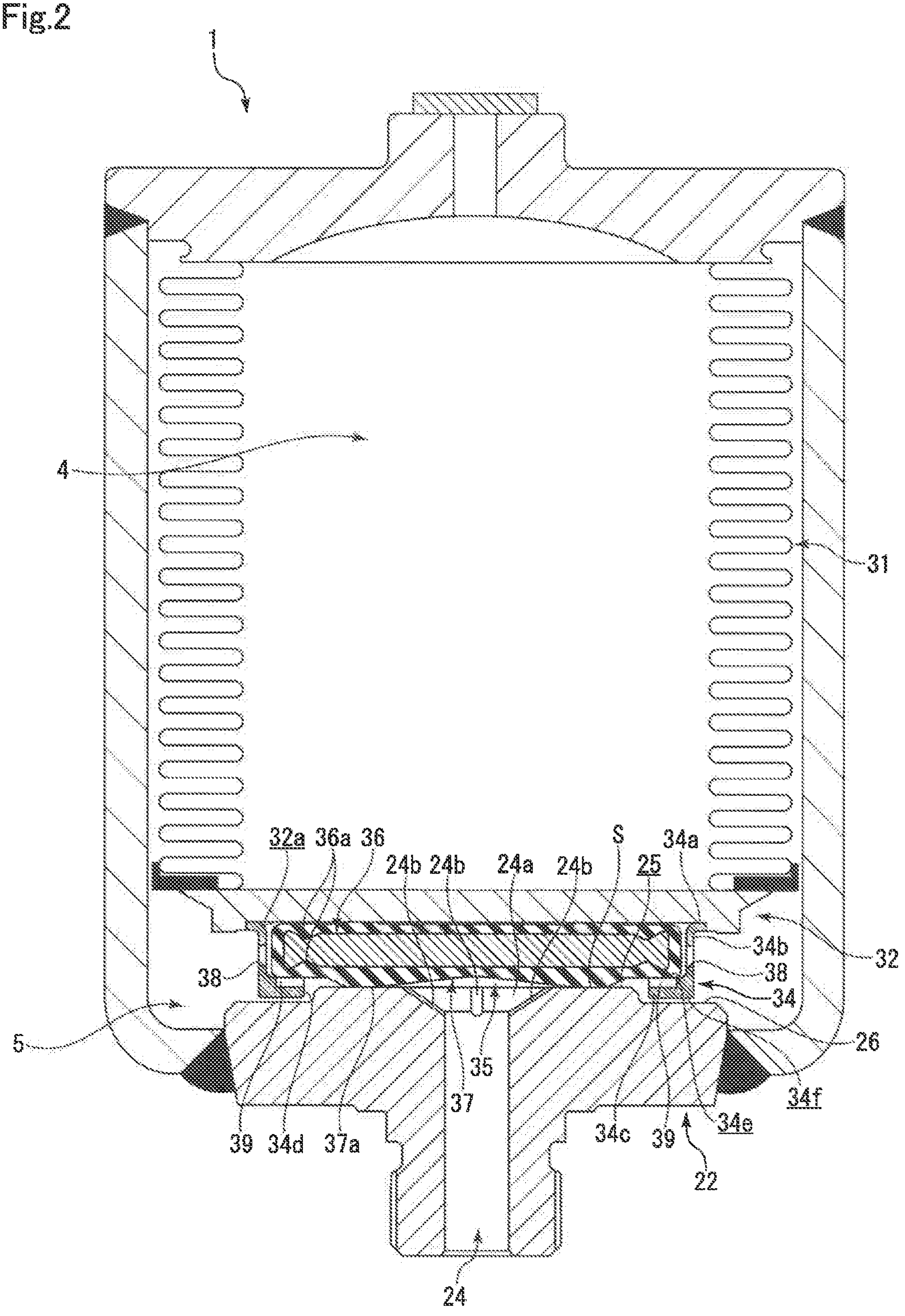
FIG. 2 is a sectional view showing a state where a sealing member and a sealing face of the accumulator shown in FIG. 1 are closely attached to each other.

For example, as shown in FIG. 2, when the liquid in the pressure pipe is discharged, the bellows cap 32 receives the gas pressure of the gas chamber 4 and moves downward, and the bellows main body 31 is expanded. Thereby, the sealing member 35 (an annular projecting portion 37*a* of the rubber-like elastic body 37 to be described later) attached to the lower face 32*a* of the bellows cap 32 and the sealing face 25 of the oil port member 22 are closely attached to each other so as to form an annular sealing portion S, and the opening portion 24*a* of the fluid inlet/outlet passage 24 is closed. Thereby, part of the liquid is locked in the liquid chamber 5, and pressure of this locked liquid and the gas pressure of the gas chamber 4 are balanced. Thus, no excessive stress is applied to the bellows main body 31, so that it is possible to suppress breakage of the bellows main body 31. A normal operation of the accumulator in which, as described above, by expanding and contracting the bellows 3 and closely attaching the sealing member 35 and the sealing face 25 to each other, the sealing portion S is formed and the opening portion 24*a* of the fluid inlet/outlet passage 24 is closed will be referred to as the steady operation of the accumulator 1.

Next, the structures of the seal holder 34 and the sealing member 35 will be described in detail. As shown in FIGS. 1 and 2, the seal holder 34 is formed by pressing a metal disc plate into a crank shape in a sectional view. The seal holder 34 includes an outward-flange-shaped fixed portion 34*a* forming an upper end of the seal holder 34, the fixed portion being welded and fixed to the lower face 32*a* of the bellows cap 32, a tubular portion 34*b* extending downward from the fixed portion 34*a* and forming a side portion of the seal holder 34, and an inward-flange-shaped holding portion 34*c* forming a lower end of the seal holder 34, the holding portion being capable of holding the sealing member 35.

The seal holder 34 is provided with an opening portion 34*d* formed by an inner diameter part of the holding portion 34*c*. Part of the sealing member 35 held by the holding portion 34*c* (rubber-like elastic body 37) is exposed to the lower side from the opening portion 34*d*. An outer diameter of the sealing member 35 is larger than an inner diameter of the holding portion 34*c*, that is, an inner diameter of the opening portion 34*d*. Therefore, in the seal holder 34, by welding and fixing the fixed portion 34*a* to the lower face 32*a* of the bellows cap 32 in a state where the sealing member 35 is mounted on an upper face 34*e* of the holding portion 34*c*, it is possible to hold the sealing member 35 in a state where the sealing member is sandwiched between the lower face 32*a* of the bellows cap 32 and the upper face 34*e* of the holding portion 34*c*.

Figure 3:
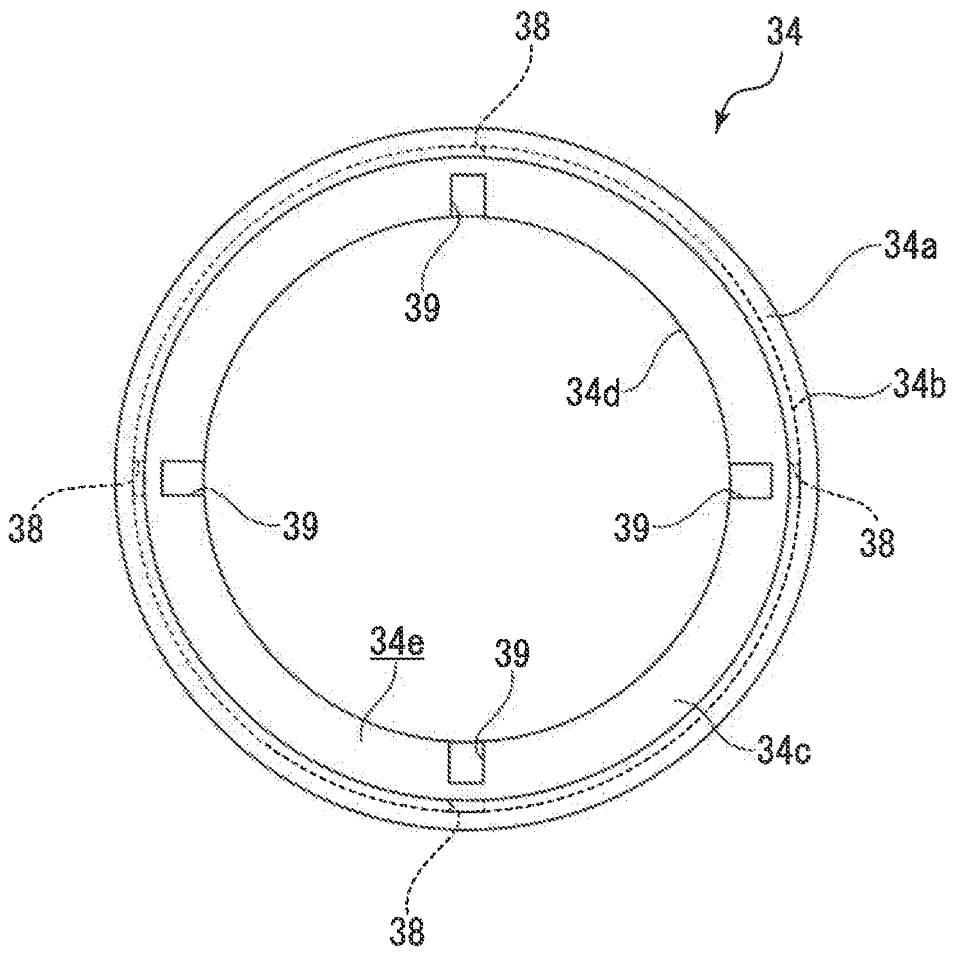
FIG. 3 is a top view showing a structure of a seal holder in the first embodiment.

As shown in FIGS. 1 to 3, a plurality of through holes 38, 38, . . . passing through in the radial direction project in the tubular portion 34*b* of the seal holder 34 at predetermined intervals in the circumferential direction. The liquid chamber 5 (the outer diameter side of the seal holder 34) and the inner diameter side of the seal holder 34 communicate with each other via the through holes 38, 38, . . . .

On the upper face 34*e* of the holding portion 34*c* of the seal holder 34, a plurality of communication recess portions 39, 39, . . . (communication passages) are formed at predetermined intervals in the circumferential direction corresponding to circumferential positions of the through holes 38, 38, . . . described above. That is, the through holes 38, 38, . . . and the communication recess portions 39, 39, . . . are arranged at positions close to each other in the circumferential direction.

As shown in FIGS. 1 and 2, the substrate 36 of the sealing member 35 is made of metal and formed in a disc shape, and annular recess portions 36*a*, 36*a* are respectively formed on upper and lower faces of the substrate on the outer diameter side. A diameter of the substrate 36 is larger than the inner diameter of the holding portion 34*c*, that is, the inner diameter of the opening portion 34*d*.

The rubber-like elastic body 37 of the sealing member 35 is attached to the entire surface of the substrate 36 described above. The annular projecting portion 37*a* projecting downward (to the sealing face 25 side) is formed in the rubber-like elastic body 37. By partially enhancing sealing face pressure of the sealing portion S at the time of closely attaching the sealing member 35 and the sealing face 25, a sealing performance is improved.

As shown in FIG. 2, at steady operation of the accumulator 1, in a state where the sealing member 35 and the sealing face 25 are closely attached to each other so as to form the sealing portion S, a lower end face 34*f* of the holding portion 34*c* of the seal holder 34 is separated from the annular face portion 26 of the oil port member 22 in the up and down direction. By this, the sealing member 35 and the sealing face 25 are closely attached to each other. Thus, it is possible to reliably make sealing in the sealing portion S.

At steady operation of the accumulator 1, the communication recess portions 39, 39, . . . provided on the upper face 34*e* of the holding portion 34*c* of the seal holder 34 are closed from the upper side by the rubber-like elastic body 37 of the sealing member 35 held on the inner diameter side of the seal holder 34. Therefore, the liquid of the liquid chamber 5 flowing in from the through holes 38, 38, . . . which are provided in the tubular portion 34*b* of the seal holder 34 is blocked by the sealing member 35 (rubber-like elastic body 37), and hence incapable of flowing into the communication recess portions 39, 39, . . . .

The sealing portion S of the sealing member 35 and the sealing face 25 is formed on the inner diameter side of the communication recess portions 39, 39, . . . . Thus, for example, even in a case where the sealing member 35 is moved in the radial direction and the communication recess portions 39, 39, . . . are not closed from the upper side by the rubber-like elastic body 37 of the sealing member 35, at steady operation of the accumulator 1, the liquid of the liquid chamber 5 flowing in from the through holes 38, 38, . . . of the seal holder 34 and passing through the communication recess portions 39, 39, . . . is blocked by the sealing member 35 and incapable of flowing into the fluid inlet/outlet passage 24. Further, the liquid of the liquid chamber 5 flowing in from a part where the lower end face 34*f* of the holding portion 34*c* of the seal holder 34 and the annular face portion 26 of the oil port member 22 are separated from each other is also blocked by the sealing member 35 and incapable of flowing into the fluid inlet/outlet passage 24.

Next, a pressure releasing flow passage formed for releasing the liquid of the liquid chamber 5 to the fluid inlet/outlet passage 24 in a state where the rubber-like elastic body 37 forming the sealing member 35 is melt and burnt out due to a high temperature of fire, etc. and the substrate 36 is exposed will be described. Hereinafter, only flows of the liquid in the pressure releasing flow passage formed on the right side on the paper plane will be shown by arrows in the figures.

Figure 4:
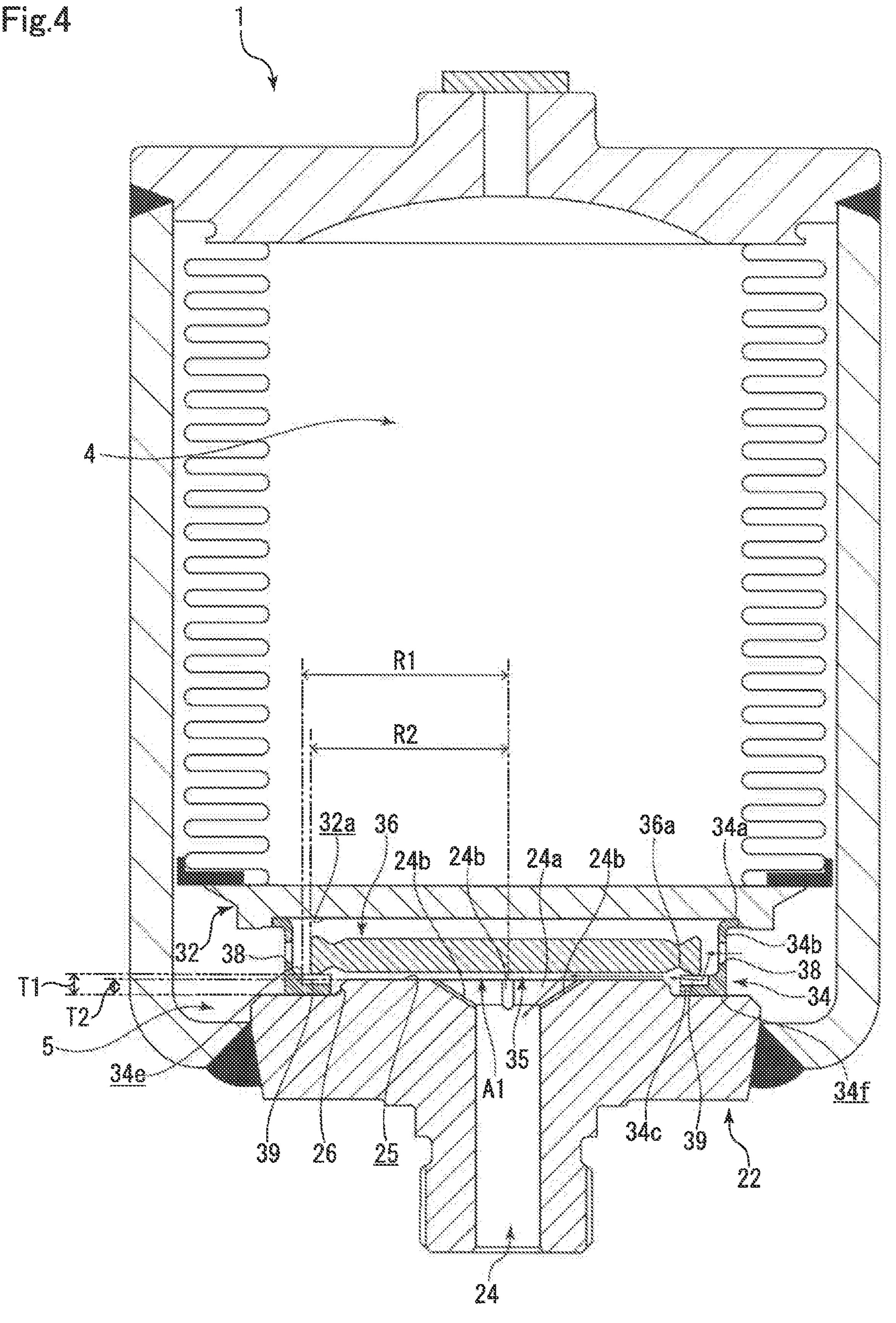
FIG. 4 is a sectional view showing a state where a rubber-like elastic body forming the sealing member of the accumulator shown in FIG. 2 is melt and burnt out and a pressure releasing flow passage is formed.

As shown in FIG. 4, in a state where the rubber-like elastic body 37 forming the sealing member 35 is melt and burnt out due to a high temperature of fire, etc. and the substrate 36 is exposed, a peripheral edge part of the substrate 36 is mounted on the upper face 34*e* of the holding portion 34*c* of the seal holder 34. This is because the outer diameter of the substrate 36 is larger than the inner diameter of the opening portion 34*d* as described above.

Since the rubber-like elastic body 37 (annular projecting portion 37*a*) closely attached to the sealing face 25 is melt and burnt out, the lower end face 34*f* of the holding portion 34*c* of the seal holder 34 is moved downward more than at steady operation and abutted with the annular face portion 26 of the oil port member 22. At this time, thickness in the up and down direction (up-down size T1) of the holding portion 34*c* of the seal holder 34 is larger than height (up-down size T2) of a level difference formed between the sealing face 25 of the oil port member 22 and the annular face portion 26. Thus, the substrate 36 mounted on the upper face 34*e* of the holding portion 34*c* of the seal holder 34 is separated from the sealing face 25 in the up and down direction.

Further, since the rubber-like elastic body 37 of the sealing member 35 is melt and burnt out, it is possible to let the liquid of the liquid chamber 5 flowing in from the through holes 38, 38, . . . of the seal holder 34 flow into a space A1 formed between the substrate 36 and the sealing face 25, the space communicating with the fluid inlet/outlet passage 24 from the outer diameter side of the communication recess portions 39, 39, . . . provided on the upper face 34*e* of the holding portion 34*c* of the seal holder 34.

By this, in a state where the rubber-like elastic body 37 forming the sealing member 35 is melt and burnt out due to a high temperature of fire, etc. and the exposed substrate 36 is mounted on the upper face 34*e* of the holding portion 34*c* of the seal holder 34, it is possible to form a pressure releasing flow passage to release the liquid of the liquid chamber 5 flowing in from the through holes 38, 38, . . . which are provided in the tubular portion 34*b* of the seal holder 34 to the fluid inlet/outlet passage 24 from the outer diameter side of the communication recess portions 39, 39, . . . provided on the upper face 34*e* of the holding portion 34*c* of the seal holder 34 through the space A1 formed between the substrate 36 and the sealing face 25, the space communicating with the inner diameter side of the communication recess portions. Thus, there is no need for specifically processing the sealing member 35 (for example, the substrate 36) and it is possible to extend the life of the accumulator 1. In addition, since it is possible to release the liquid of the liquid chamber 5 to the fluid inlet outlet passage 24, it is possible to suppress a radical increase in the pressure of the liquid chamber 5, and by extension, the pressure of the gas chamber 4.

The through holes 38, 38, . . . are provided in the tubular portion 34*b* of the seal holder 34. Thus, at the time of melting and burning the rubber-like elastic body 37, the liquid of the liquid chamber 5 immediately flows into the inner diameter side of the seal holder 34 from the through holes 38, 38, . . . and it is possible to promptly lower the pressure of the liquid chamber 5. Further, even when the volume of the gas in the gas chamber 4 is increased due to a high temperature and the bellows main body 31 is inflated outward in the radial direction, it is possible to appropriately release the liquid of the liquid chamber 5 to the fluid inlet/outlet passage 24.

By releasing the liquid of the liquid chamber 5 to the fluid inlet/outlet passage 24 through the pressure releasing flow passage, balance is lost between the liquid pressure in the liquid chamber 5 on the outside of the bellows main body 31 and the gas pressure in the gas chamber 4 on the inside of the bellows main body 31, and the bellows main body 31 is broken. As a result, the gas chamber 4 and the liquid chamber 5 communicate with each other through the broken part of the bellows main body 31, and it is possible to release the high-pressure gas in the gas chamber 4 to the fluid inlet/outlet passage 24 by the pressure releasing flow passage formed in the liquid chamber 5. Therefore, it is possible to prevent breakage of the housing 2 due to an increase in the pressure in the gas chamber 4.

As described above, a plurality of the through holes 38, 38, . . . and a plurality of the communication recess portions 39, 39, . . . are provided in the circumferential direction. Thus, it is possible to ensure a flow rate of the pressure releasing flow passage, and to release the liquid of the liquid chamber 5 and the high-pressure gas of the gas chamber 4 to the fluid inlet outlet passage 24 for a short time.

Since the through holes 38, 38, . . . and the communication recess portions 39, 39, . . . are aligned in the radial direction, it is possible to efficiently release the liquid of the liquid chamber 5 and the high-pressure gas of the gas chamber 4 to the fluid inlet/outlet passage 24 by the pressure releasing flow passage. Further, since the through holes 38, 38, . . . and the communication recess portions 39, 39, . . . are arranged in a substantially radial manner, it is possible to efficiently release the liquid of the liquid chamber 5 and the high-pressure gas of the gas chamber 4 to the fluid inlet/outlet passage 24.

In a state where the peripheral edge part of the substrate 36 is mounted on the upper face 34*e* of the holding portion 34*c* of the seal holder 34, it is possible to ensure a large space from the communication recess portions 39, 39, . . . by the annular recess portion 36*a* provided on the outer diameter side lower face of the substrate 36. Thus, it is possible to increase the flow rate of the pressure releasing flow passage.

A radius R1 of a circle through outer diameter parts of the communication recess portions 39, 39, . . . provided on the upper face 34*e* of the holding portion 34*c* of the seal holder 34 is larger than a radius R2 of the substrate 36. Thereby, irrespective of a position where the substrate 36 is mounted on the upper face 34*e* of the holding portion 34*c* of the seal holder 34, it is possible to maintain a state where any of the communication recess portions 39, 39, . . . is open to the upper side. Thus, it is possible to reliably form the pressure releasing flow passage. In order to more reliably form the pressure releasing flow passage, the communication recess portions 39, 39, . . . are preferably arranged so as to oppose each other on a diameter of the above circle.

The seal holder 34 is an annular member formed by pressing a metal disc plate, and has a simple structure. Thus, even in a situation where the rubber-like elastic body 37 forming the sealing member 35 is melt and burnt out due to a high temperature of fire, etc., the structure is maintained and the pressure releasing flow passage is easily formed.

As described above, in the fluid inlet/outlet passage 24, the opening portion 24*a* is formed in the funnel shape gradually spreading upward, and the groove portions 24*b*, 24*b*, . . . extending along the inclination of the funnel shape are formed. Thus, in a state where the substrate 36 is mounted on the upper face 34*e* of the holding portion 34*c* of the seal holder 34, and even in a case where the substrate 36 is warped to the opening portion 24*a* side of the fluid inlet/outlet passage 24 due to a high temperature, etc., by the funnel shape, the opening portion 24*a* of the fluid inlet/outlet passage 24 is not easily closed. Even in a case where the opening portion 24*a* of the fluid inlet/outlet passage 24 is substantially closed by the warped substrate 36, it is possible to release the liquid of the liquid chamber 5 and the high-pressure gas of the gas chamber 4 to the fluid inlet/outlet passage 24 through the groove portions 24*b*, 24*b*, . . . . Thus, it is possible to reliably form the pressure releasing flow passage.

It is possible to form the pressure releasing flow passage by the holding portion 34*c*, the through holes 38, 38, . . . , and the communication recess portions 39, 39, . . . of the seal holder 34. Thus, only by a task of replacing a seal holder 34 of a conventional accumulator, it is possible to form a pressure releasing flow passage in the accumulator.

Second Embodiment

Figure 5:
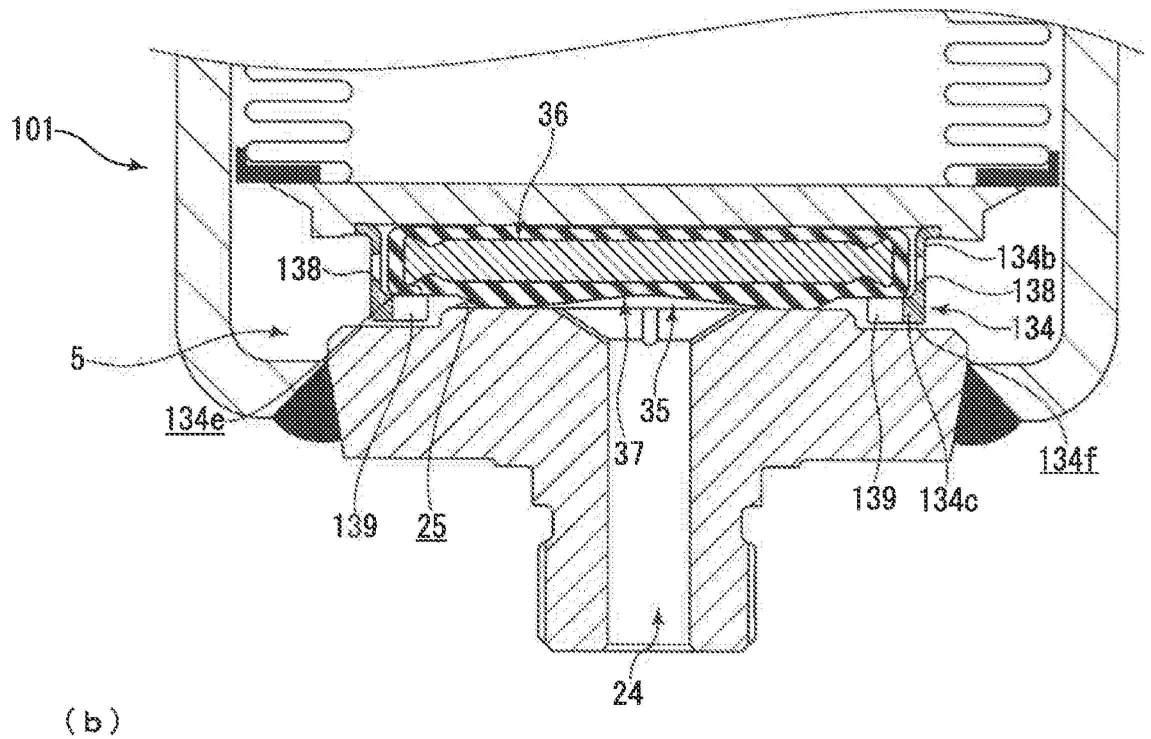
FIG. 5 shows an accumulator according to a second embodiment of the present invention.
Figure 5:
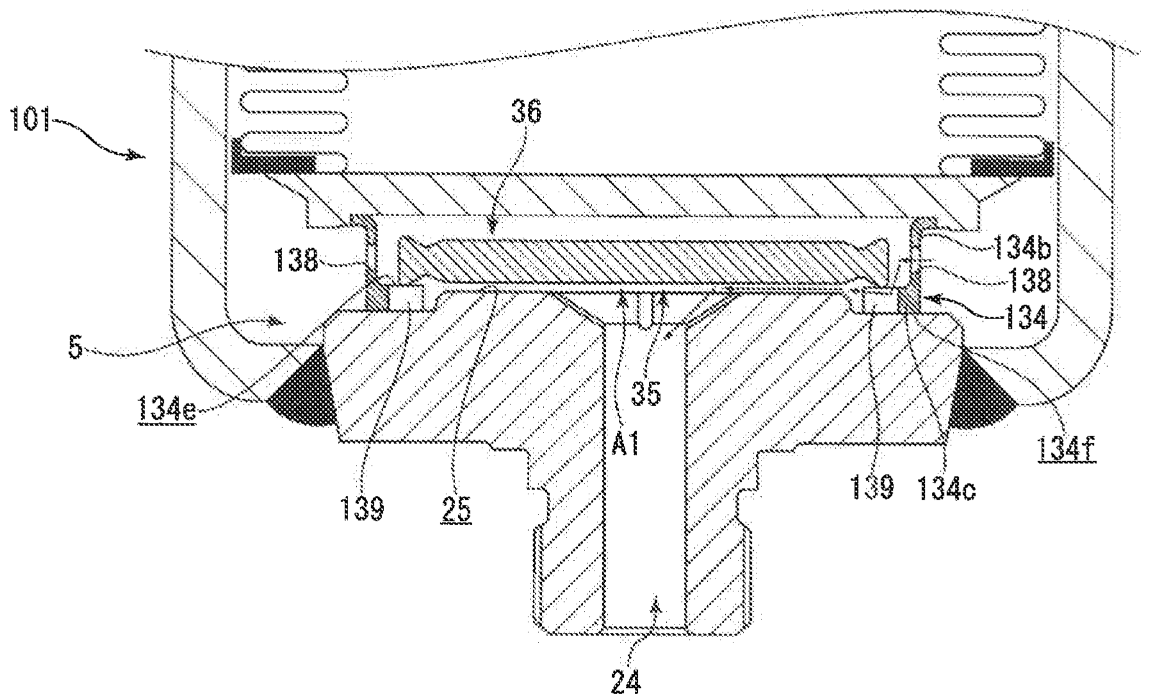

Next, an accumulator according to a second embodiment of the present invention will be described with reference to FIG. 5. The same constituent parts as the constituent parts shown in the above embodiment of the present invention will be given the same reference signs, and duplicated description will be omitted.

As shown in FIG. 5A, an accumulator 101 in the second embodiment includes a plurality of through holes 138, 138, . . . passing through in the radial direction and provided in a tubular portion 134*b* of a seal holder 134 at predetermined intervals in the circumferential direction. In a holding portion 134*c* of the seal holder 134, a plurality of communication recess portions 139, 139, . . . are formed at predetermined intervals in the circumferential direction corresponding to circumferential positions of the through holes 138, 138, . . . described above. The communication recess portions 139, 139, . . . are formed by cutting out the holding portion 134*c* from an upper face 134*e* to a lower face 134*f* in the up and down direction.

Therefore, as shown in FIG. 5B, in a state where the rubber-like elastic body 37 forming the sealing member 35 is melt and burnt out due to a high temperature of fire, etc. and the exposed substrate 36 is mounted on the upper face 134*e* of the holding portion 134*c* of the seal holder 134, it is possible to form a pressure releasing flow passage to release the liquid of the liquid chamber 5 flowing in from the through holes 138, 138, . . . which are provided in the tubular portion 134*b* of the seal holder 134 to the fluid inlet/outlet passage 24 from the outer diameter side of the communication recess portions 139, 139, . . . provided on the upper face 134*e* of the holding portion 134*c* of the seal holder 134 through the space A1 formed between the substrate 36 and the sealing face 25, the space communicating with the inner diameter side of the communication recess portions. Thus, there is no need for specifically processing the sealing member 35 and it is possible to extend the life of the accumulator 101. In addition, since it is possible to release the liquid of the liquid chamber 5 to the fluid inlet/outlet passage 24, it is possible to suppress a radical increase in the pressure of the liquid chamber 5, and by extension, the pressure of the gas chamber 4.

In the accumulator 101, since the communication recess portions 139, 139, are formed by cutting out the holding portion 134*c* from the upper face 134*e* to the lower face 134*f* in the up and down direction, it is possible to ensure a large space from the substrate 36. Thus, it is possible to increase a flow rate of the pressure releasing flow passage.

Third Embodiment

Figure 6:
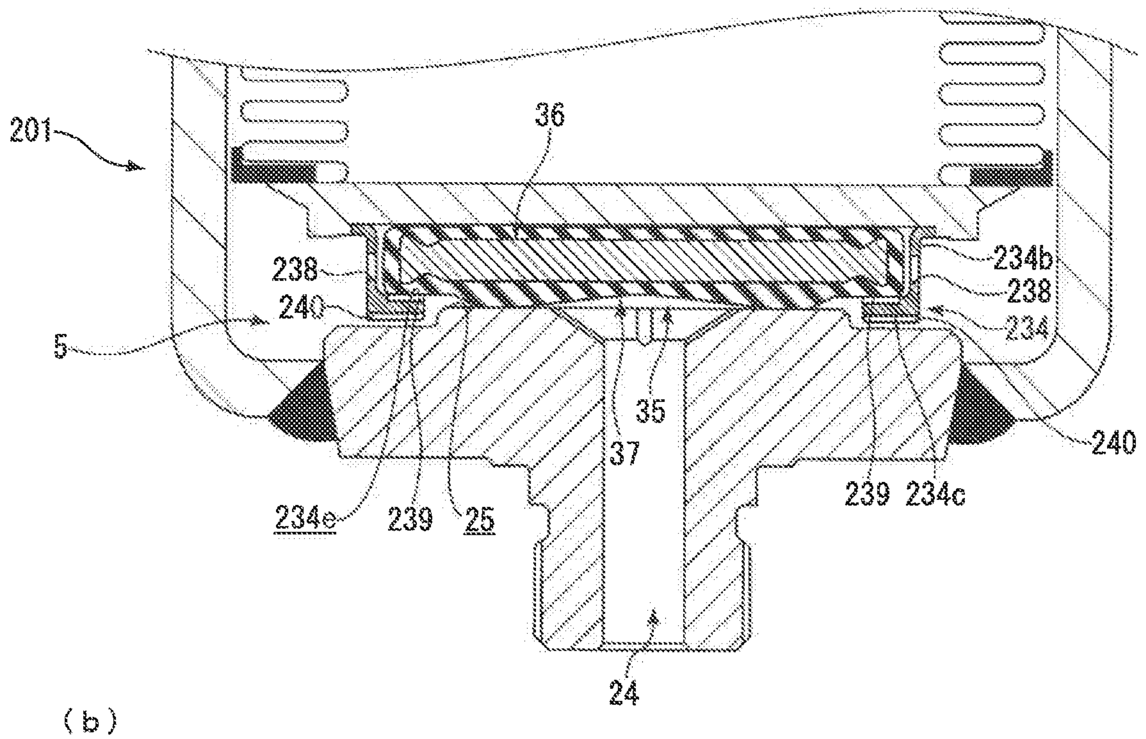
FIG. 6 shows an accumulator according to a third embodiment of the present invention.
Figure 6:
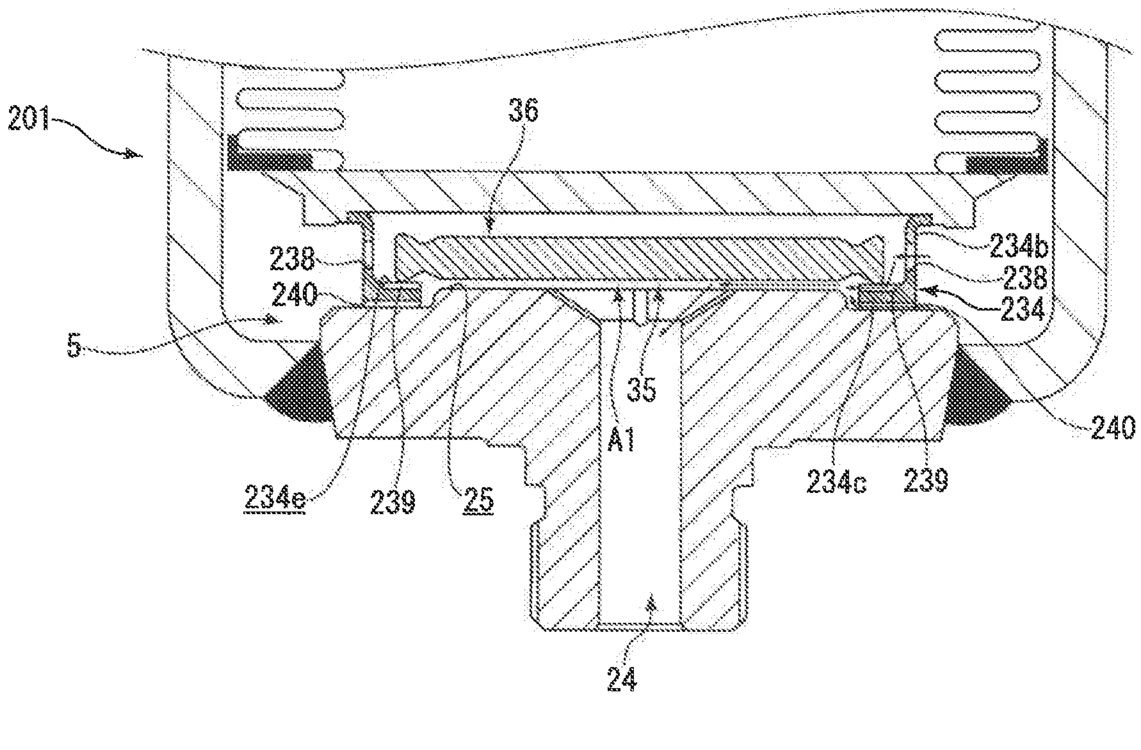

Next, an accumulator according to a third embodiment of the present invention will be described with reference to FIG. 6. The same constituent parts as the constituent parts shown in the above embodiments of the present invention will be given the same reference signs, and duplicated description will be omitted.

As shown in FIG. 6A, an accumulator 201 in the third embodiment of the present invention includes a plurality of through holes 238, 238, . . . passing through in the radial direction and provided in a tubular portion 234*b* of a seal holder 234 at predetermined intervals in the circumferential direction. In a holding portion 234*c* of the seal holder 234, a plurality of communication recess portions 239, 239, . . . are formed on an upper face 234*e* of the holding portion 234*c* at predetermined intervals in the circumferential direction corresponding to circumferential positions of the through holes 236, 236, . . . described above, and communication recess portions 240, 240, . . . extending in the radial direction are formed on a lower face 234*f* of the holding portion 234*c*.

Therefore, as shown in FIG. 6B, in a state where the rubber-like elastic body 37 of the sealing member 35 is melt and burnt out due to a high temperature of fire, etc. and the exposed substrate 36 is mounted on the upper face 234*e* of the holding portion 234*c* of the seal holder 234, it is possible to form a pressure releasing flow passage to release the liquid of the liquid chamber 5 flowing in from the through holes 238, 238, . . . which are provided in the tubular portion 234*b* of the seal holder 234 to the fluid inlet/outlet passage 24 from the outer diameter side of the communication recess portions 239, 239, . . . provided on the upper face 234*e* of the holding portion 234*c* of the seal holder 234 through the space A1 formed between the substrate 36 and the sealing face 25, the space communicating with the inner diameter side of the communication recess portions, and a pressure releasing flow passage to release the liquid of the liquid chamber 5 to the fluid inlet/outlet passage 24 from the outer diameter side of the communication recess portions 240, 240, . . . provided on the lower face 234*f* of the holding portion 234*c* of the seal holder 234 directly through the space A1 communicating with the inner diameter side of the communication recess portions. Thus, there is no need for specifically processing the sealing member 35 and it is possible to extend the life of the accumulator 201. In addition, since it is possible to release the liquid of the liquid chamber 5 to the fluid inlet/outlet passage 24, it is possible to suppress a radical increase in the pressure of the liquid chamber 5, and by extension, the pressure of the gas chamber 4.

In the accumulator 201, since it is possible to form two types of pressure releasing flow passages, it is possible to increase a flow rate of the pressure releasing flow passages. Further, for example, even in a case where burnt rubber residues clog the communication recess portions 239, 239, . . . provided on the upper face 234*e* of the holding portion 234*c* of the seal holder 234 which is closely aligned to the rubber-like elastic body 37, it is possible to release the liquid of the liquid chamber 5 and the high-pressure gas of the gas chamber 4 to the fluid inlet/outlet passage 24 from the communication recess portions 240, 240, . . . provided on the lower face 234*f* of the holding portion 234*c* of the seal holder 234. Thus, it is possible to more reliably form the pressure releasing flow passage.

Fourth Embodiment

Figure 7:
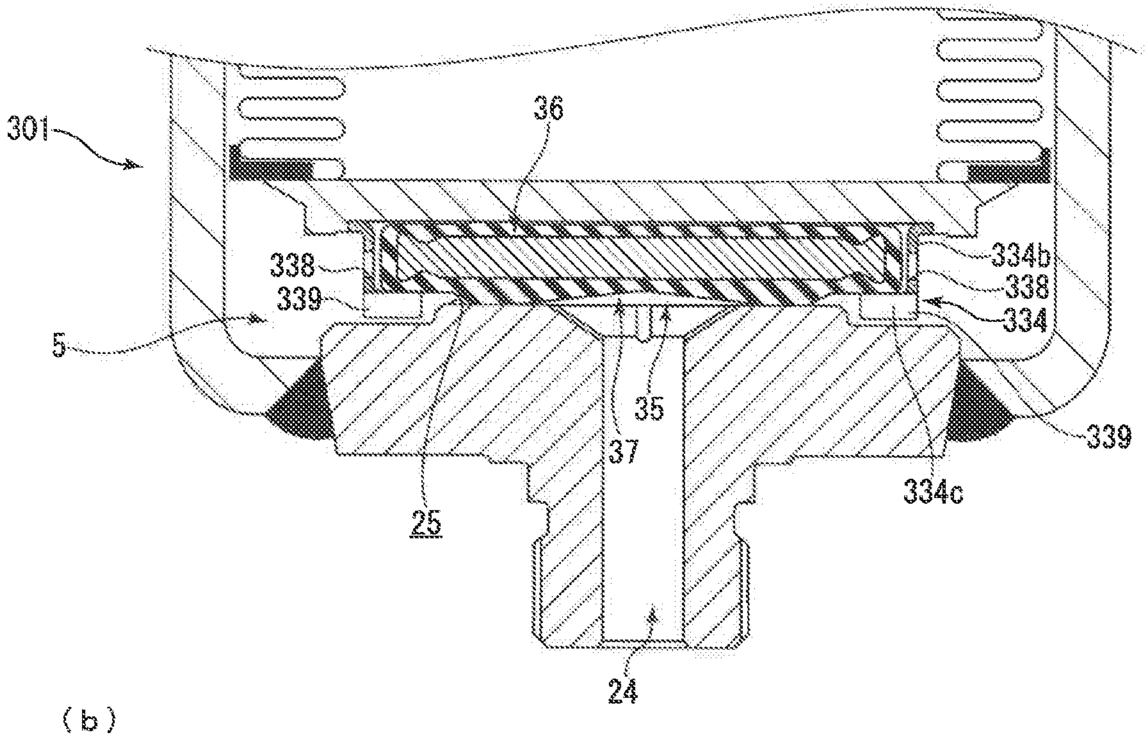
FIG. 7 shows an accumulator according to a fourth embodiment of the present invention.
Figure 7:
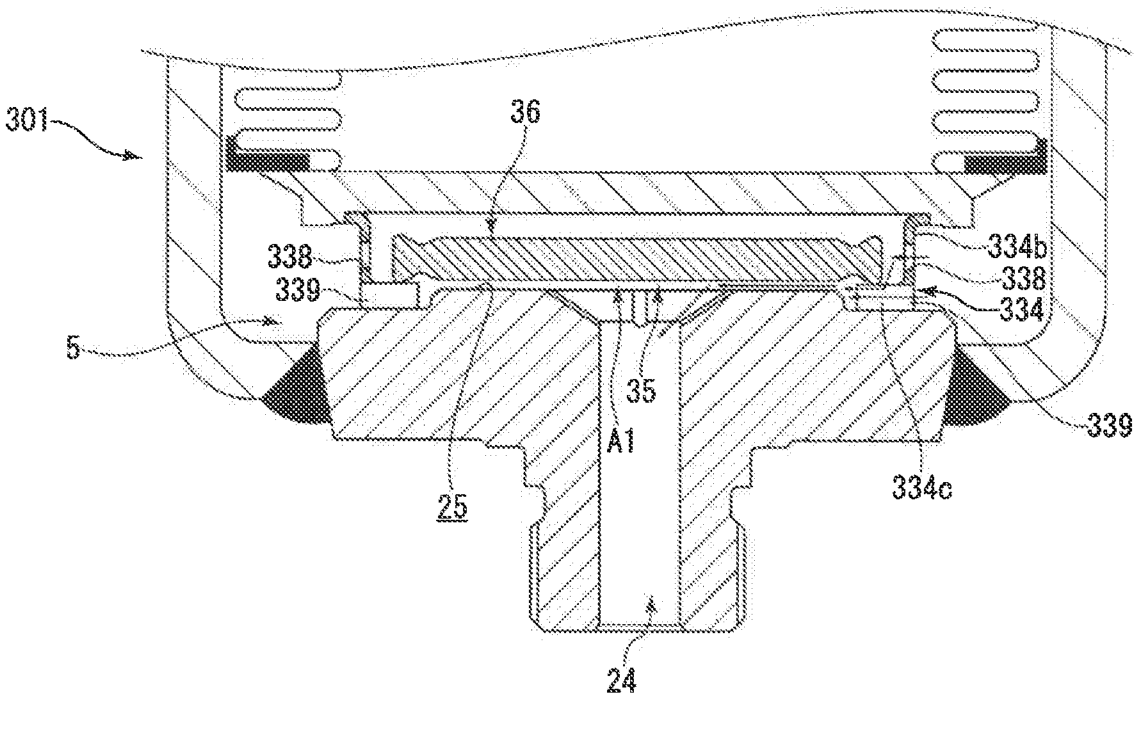

Next, an accumulator according to a fourth embodiment of the present invention will be described with reference to FIG. 7. The same constituent parts as the constituent parts shown in the above embodiments of the present invention will be given the same reference signs, and duplicated description will be omitted.

As shown in FIG. 7A, an accumulator 301 in the fourth embodiment of the present invention includes a plurality of through holes 338, 338, . . . passing through in the radial direction and provided in a tubular portion 334*b* of a seal holder 334 at predetermined intervals in the circumferential direction. In a holding portion 334*c* of the seal holder 334, a plurality of communication recess portions 339, 339, . . . are formed at predetermined intervals in the circumferential direction corresponding to circumferential positions of the through holes 338, 338, . . . described above. The communication recess portions 339, 339, . . . are formed by cutting out the holding portion 334*c* so as to pass through in the radial direction.

As shown in FIG. 7B, in a state where the rubber-like elastic body 37 of the sealing member 35 is melt and burnt out due to a high temperature of fire, etc. and the exposed substrate 36 is mounted on an upper face 334*e* of the holding portion 334*c* of the seal holder 334, it is possible to form a pressure releasing flow passage to release the liquid of the liquid chamber 5 flowing in from the through holes 338, 338, . . . which are provided in the tubular portion 334*b* of the seal holder 334 to the fluid inlet/outlet passage 24 from the outer diameter side of the communication recess portions 339, 339, . . . provided in the holding portion 334*c* of the seal holder 334 through the space A1 formed between the substrate 36 and the sealing face 25, the space communicating with the inner diameter side of the communication recess portions, and a pressure releasing flow passage to release the liquid of the liquid chamber to the fluid inlet/outlet passage 24 from the outer diameter side of the communication recess portions 339, 339, . . . directly through the space A1 communicating with the inner diameter side of the communication recess portions. Thus, there is no need for specifically processing the sealing member 35 and it is possible to extend the life of the accumulator 301. In addition, since it is possible to release the liquid of the liquid chamber 5 to the fluid inlet/outlet passage 24, it is possible to suppress a radical increase in the pressure of the liquid chamber 5, and by extension, the pressure of the gas chamber 4.

In the accumulator 301, since it is possible to form two types of pressure releasing flow passages and it is possible to form large communication recess portions 339, 339, . . . , burnt rubber residues do not easily clog the communication recess portions 339, 339, . . . , and it is possible to more reliably form the pressure releasing flow passage.

Fifth Embodiment

Figure 8:
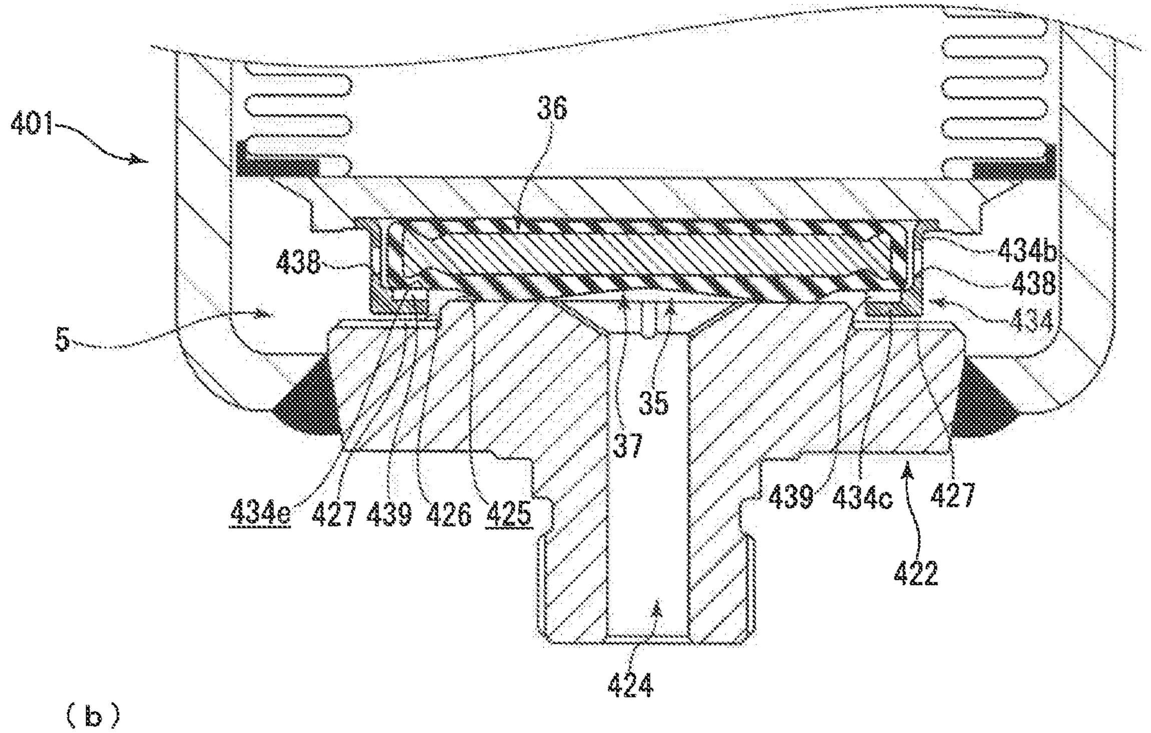
FIG. 8 shows an accumulator according to a fifth embodiment of the present invention.
Figure 8:
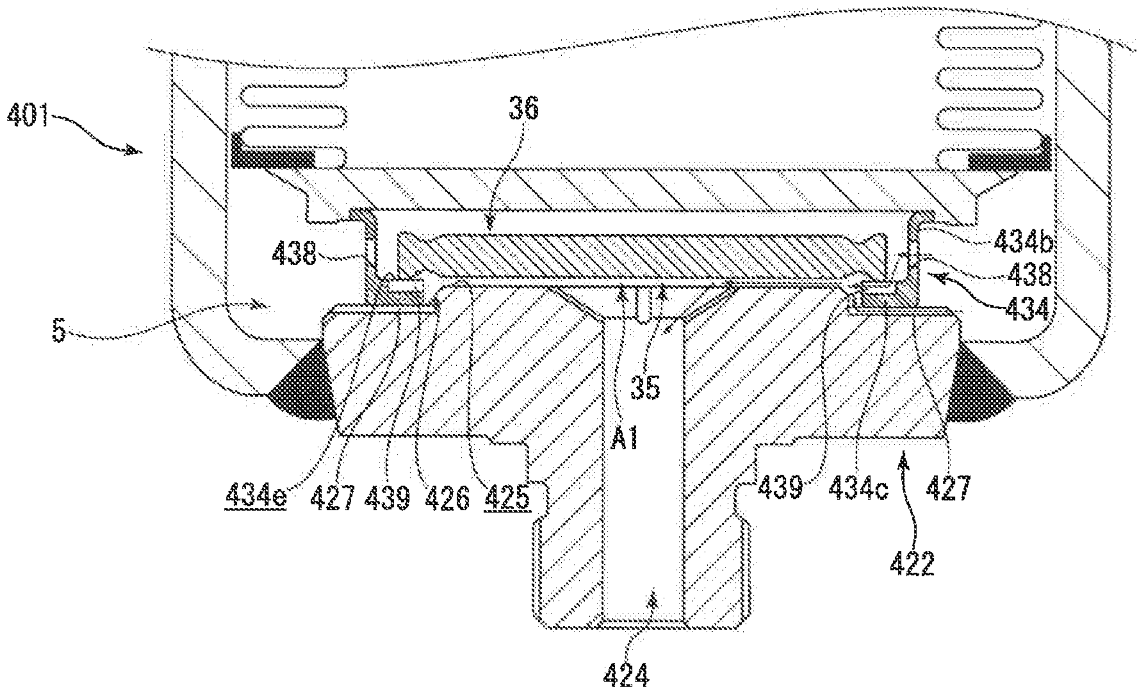

Next, an accumulator according to a fifth embodiment of the present invention will be described with reference to FIG. 8. The same constituent parts as the constituent parts shown in the above embodiments of the present invention will be given the same reference signs, and duplicated description will be omitted.

As shown in FIG. 8A, an accumulator 401 in the fifth embodiment of the present invention includes a plurality of through holes 438, 438, . . . passing through in the radial direction and provided in a tubular portion 434*b* of a seal holder 434 at predetermined intervals in the circumferential direction. In a holding portion 434*c* of the seal holder 434, a plurality of communication recess portions 439, 439, . . . are formed on an upper face 434*e* of the holding portion 434*c* at predetermined intervals in the circumferential direction corresponding to circumferential positions of the through holes 438, 438, . . . described above.

In an annular face portion 426 of an oil port member 422, communication recess portions 427, 427, . . . extending in the radial direction are formed at predetermined intervals in the circumferential direction corresponding to circumferential positions of the through holes 438, 438, . . . and the communication recess portions 439, 439, . . . .

As shown in FIG. 8B, in a state where the rubber-like elastic body 37 of the sealing member 35 is melt and burnt out due to a high temperature of fire, etc. and the exposed substrate 36 is mounted on the upper face 434*e* of the holding portion 434*c* of the seal holder 434, it is possible to form a pressure releasing flow passage to release the liquid of the liquid chamber 5 flowing in from the through holes 438, 438, . . . which are provided in the tubular portion 434*b* of the seal holder 434 to a fluid inlet/outlet passage 424 from the outer diameter side of the communication recess portions 439, 439, . . . provided on the upper face 434*e* of the holding portion 434*c* of the seal holder 434 through the space A1 formed between the substrate 36 and a sealing face 425, the space communicating with the inner diameter side of the communication recess portions, and a pressure releasing flow passage to release the liquid of the liquid chamber 5 to the fluid inlet/outlet passage 424 from the outer diameter side of the communication recess portions 427, 427 . . . provided in the annular face portion 426 of the oil port member 422 directly through the space A1 communicating with the inner diameter side of the communication recess portions. Thus, there is no need for specifically processing the sealing member 35 and it is possible to extend the life of the accumulator 401. In addition, since it is possible to release the liquid of the liquid chamber 5 to the fluid inlet/outlet passage 424, it is possible to suppress a radical increase in the pressure of the liquid chamber 5, and by extension, the pressure of the gas chamber 4.

In the accumulator 401, since it is possible to form two types of pressure releasing flow passages, it is possible to increase a flow rate of the pressure releasing flow passages. Further, for example, even in a case where burnt rubber residues clog the communication recess portions 439, 439, . . . provided on the upper face 434*e* of the holding portion 434*c* of the seal holder 434 which is closely aligned to the rubber-like elastic body 37, it is possible to release the liquid of the liquid chamber 5 and the high-pressure gas of the gas chamber 4 to the fluid inlet/outlet passage 424 from the communication recess portions 427, 427, . . . provided in the annular face portion 426 of the oil port member 422. Thus, it is possible to more reliably form the pressure releasing flow passage.

Six Embodiment

Figure 9:
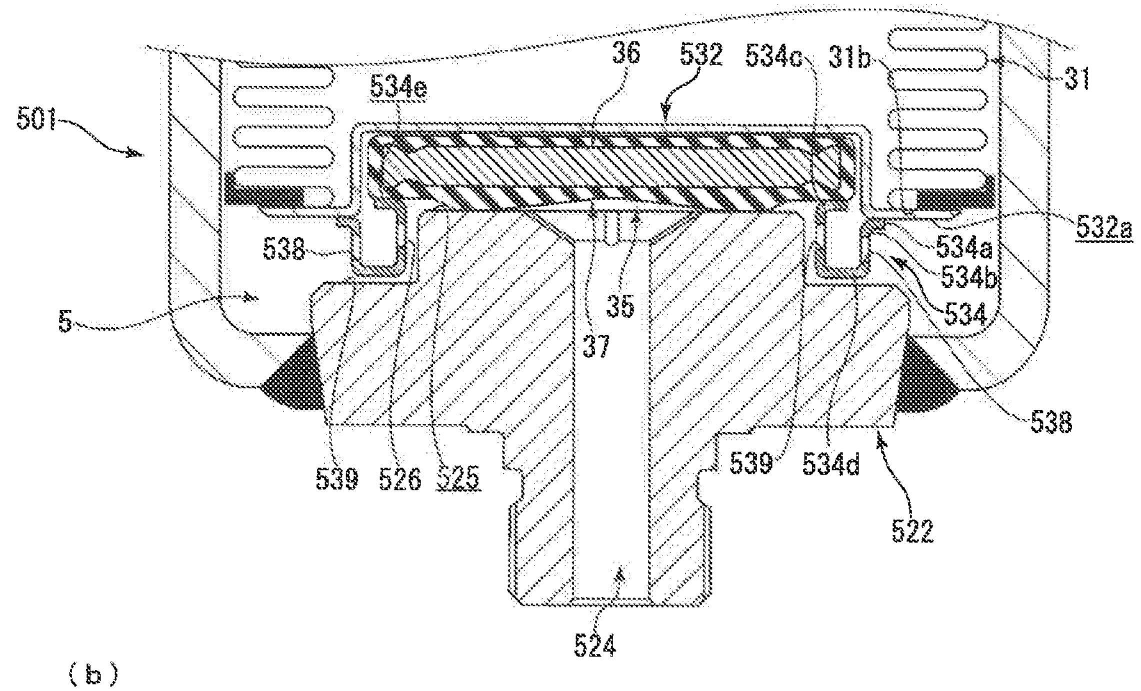
FIG. 9 shows an accumulator according to a sixth embodiment of the present invention.
Figure 9:
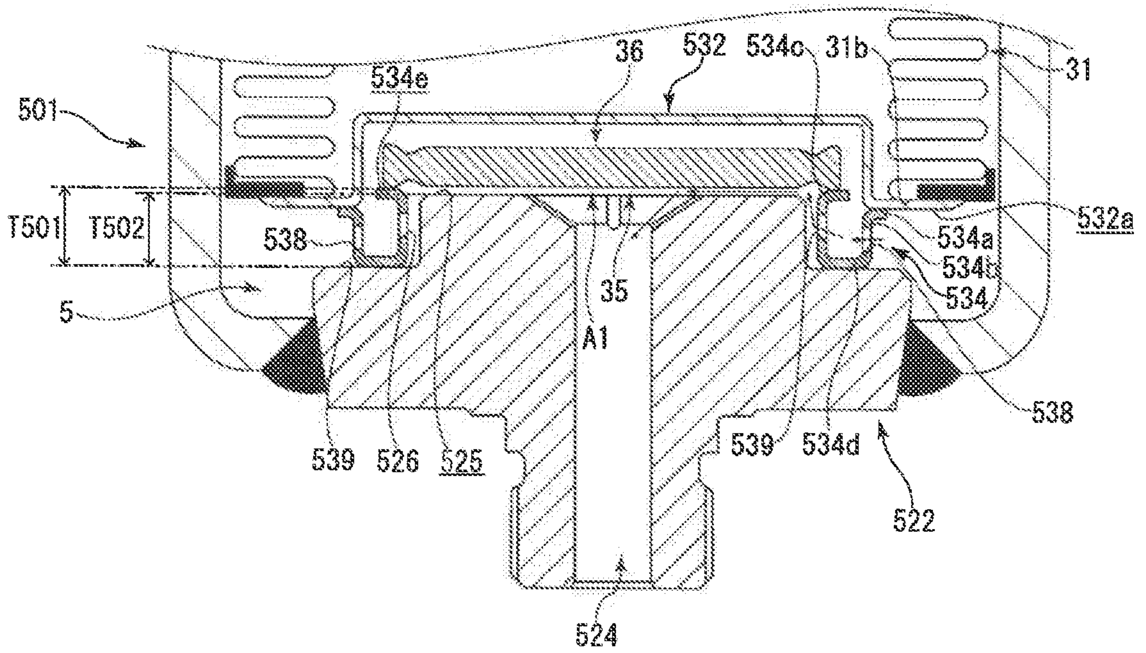

Next, an accumulator according to a sixth embodiment of the present invention will be described with reference to FIG. 9. The same constituent parts as the constituent parts shown in the above embodiments of the present invention will be given the same reference signs, and duplicated description will be omitted.

As shown in FIG. 9A, an accumulator 501 in the sixth embodiment of the present invention includes a bellows cap 532 projected upward in a sectional view which is welded and fixed so as to close the playing end 31*b* forming the lower end of the bellows main body 31. On an outer diameter side lower face 532*a* of the bellows cap 532, a fixed portion 534*a* of a seal holder 534 formed in an upward substantially-U shape in a sectional view is welded and fixed.

The seal holder 534 includes a vertical portion 534*b* extending downward from the fixed portion 534*a*, a bottom portion 534*d* extending to the inner diameter side from a lower end of the vertical portion 534*b*, and a standing portion 534*c* standing upward from an inner diameter side end portion of the bottom portion 534*d*, the standing portion being formed in a reversed L shape in a sectional view. In the vertical portion 534*b* of the seal holder 534, a plurality of through holes 538, 538, . . . passing through in the radial direction project at predetermined intervals in the circumferential direction. In the standing portion 534*c* of the seal holder 534, a plurality of communication holes 539, 539, . . . passing through in the radial direction are formed at predetermined intervals in the circumferential direction corresponding to circumferential positions of the through holes 538, 538, . . . described above.

Height (upper limit size T501) of the standing portion 534*c* is larger than height (up-down size T502) of a level difference between a sealing face 525 of an oil port member 522 and an annular face portion 526.

As shown in FIG. 9B, in a state where the rubber-like elastic body 37 of the sealing member 35 is melt and burnt out due to a high temperature of fire, etc. and the exposed substrate 36 is mounted on an upper face 534*e* of the standing portion 534*c* of the seal holder 534, it is possible to form a pressure releasing flow passage to release the liquid of the liquid chamber 5 flowing in from the through holes 538, 538, . . . which are provided in the vertical portion 534*b* of the seal holder 534 to a fluid inlet/outlet passage 524 from the outer diameter side of the communication holes 539, 539, . . . provided in the standing portion 534*c* of the seal holder 534 through the space A1 formed between the substrate 36 and the sealing face 525, the space communicating with the inner diameter side of the communication holes. Thus, there is no need for specifically processing the sealing member 35 and it is possible to extend the life of the accumulator 501. In addition, since it is possible to release the liquid of the liquid chamber 5 to the fluid inlet/outlet passage 524, it is possible to suppress a radical increase in the pressure of the liquid chamber 5, and by extension, the pressure of the gas chamber 4.

The communication holes 539, 539, . . . provided in the standing portion 534*c* of the seal holder 534 may be formed by cutting out the standing portion 534*c* or cutting out from the standing portion 534*c* to the bottom portion 534*d*, or a recess portion may be provided on a lower face of the bottom portion 534*d*. A recess portion may be formed in the annular face portion 526 of the oil port member 522.

Seventh Embodiment

Figure 10:
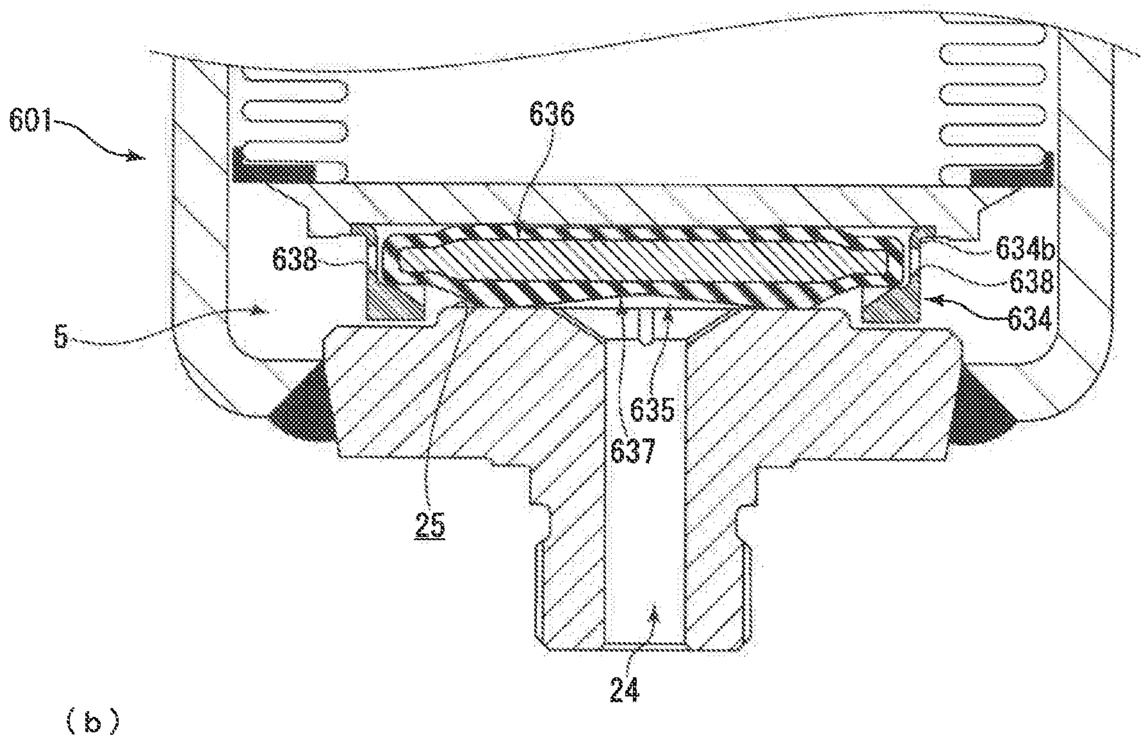
FIG. 10 shows an accumulator according to a seventh embodiment of the present invention.
Figure 10:
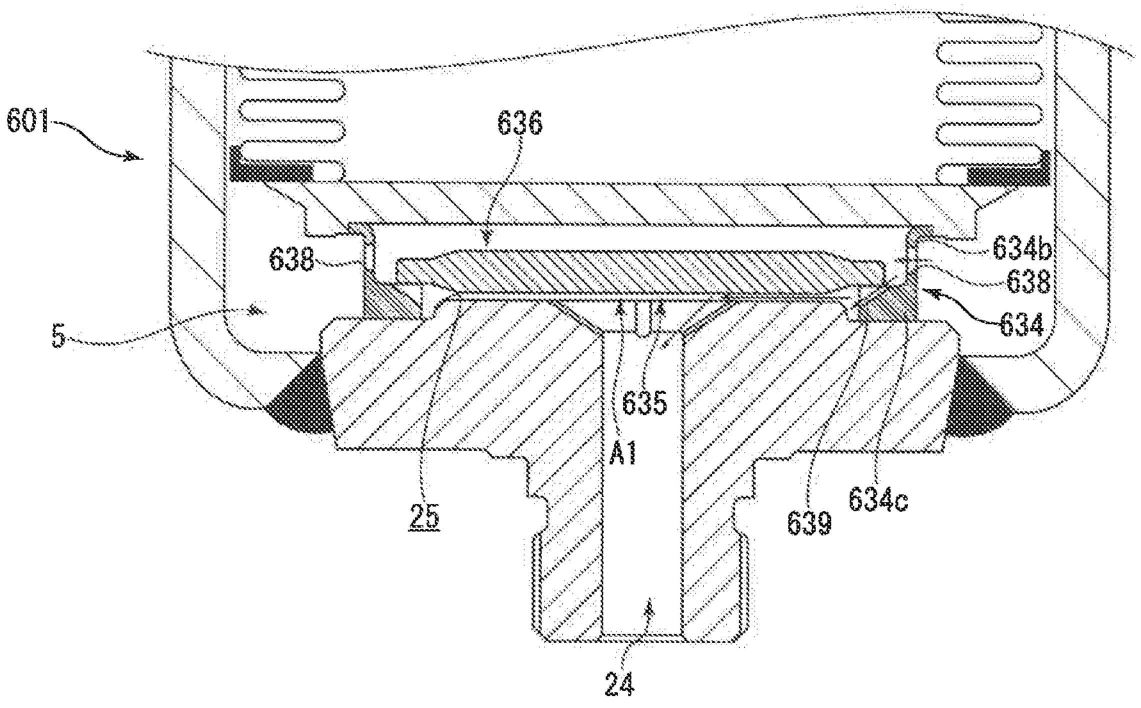

Next, an accumulator according to a seventh embodiment of the present invention will be described with reference to FIG. 10. The same constituent parts as the constituent parts shown in the above embodiments of the present invention will be given the same reference signs, and duplicated description will be omitted.

As shown in FIG. 10A, an accumulator 601 in the seventh embodiment of the present invention a plurality of through holes 638, 638, . . . passing through in the radial direction project in a tubular portion 634*b* of a seal holder 634 at predetermined intervals in the circumferential direction. In a holding portion 634*c* of the seal holder 634, a plurality of communication recess portions 639, 639, . . . are formed on an upper face 634*e* of the holding portion 634*c* at predetermined intervals in the circumferential direction corresponding to circumferential positions of the through holes 638, 638, . . . described above. The communication recess portions 639, 639, . . . are inclined downward from the outer diameter side of the holding portion 634*c* to the inner diameter side.

A substrate 636 forming a sealing member 635 is formed to have thin outer diameter side thickness, and a rubber-like elastic body 637 is attached to the entire surface of the substrate.

As shown in FIG. 10E, in a state where the rubber-like elastic body 637 of the sealing member 535 is melt and burnt out due to a high temperature of fire, etc. and the exposed substrate 636 is mounted on the upper face 634*e* of the holding portion 634*c* of the seal holder 634, it is possible to form a pressure releasing flow passage to release the liquid of the liquid chamber 5 flowing in from the through holes 638, 638, . . . which are provided in the tubular portion 634*b* of the seal holder 634 to the fluid inlet/outlet passage 24 from the outer diameter side of the communication recess portions 639, 639, . . . provided on the upper face 634*e* of the holding portion 634*c* of the seal holder 634 through the space A1 formed between the substrate 636 and the sealing face 25, the space communicating with the inner diameter side of the communication recess portions. Thus, there is no need for specifically processing the sealing member 635 and it is possible to extend the life of the accumulator 601. In addition, since it is possible to release the liquid of the liquid chamber 5 to the fluid inlet/outlet passage 24, it is possible to suppress a radical increase in the pressure of the liquid chamber 5, and by extension, the pressure of the gas chamber 4.

In the accumulator 601, by having thin outer diameter side thickness of the substrate 636, it is possible to ensure a large space from the communication recess portions 639, 639, . . . . Thus, it is possible to increase a flow rate of the pressure releasing flow passage.

Eight Embodiment

Figure 11:
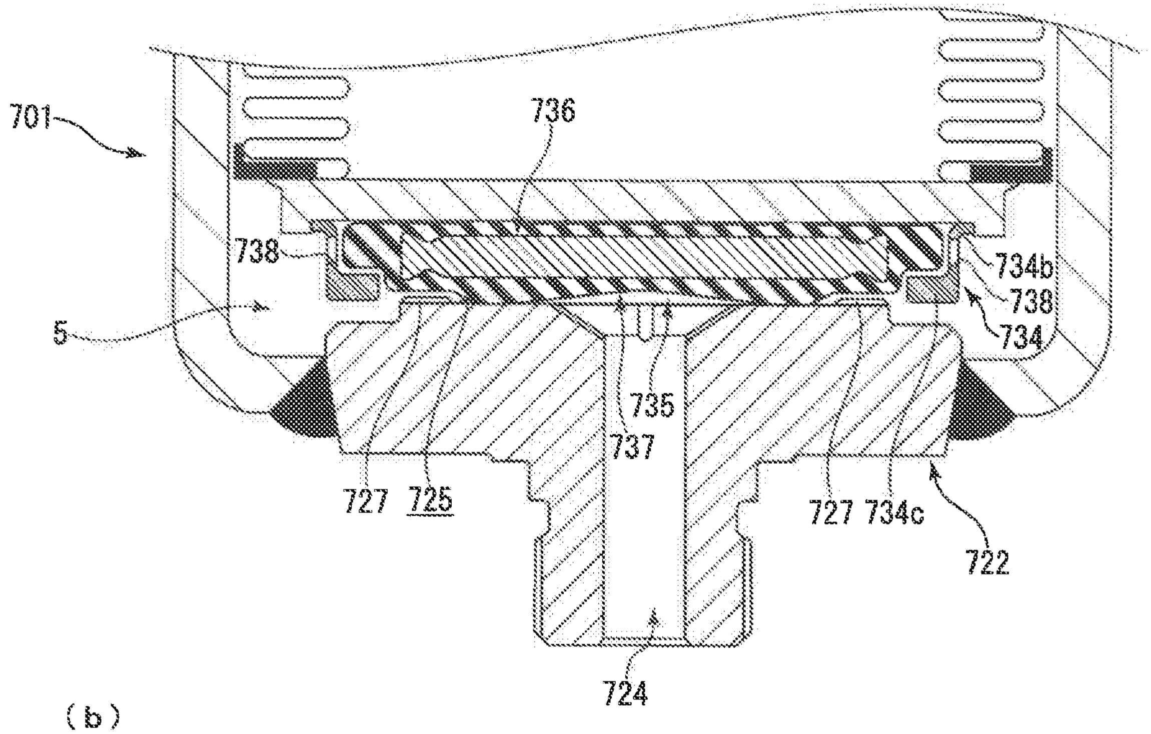
FIG. 11 shows an accumulator according to an eighth embodiment of the present invention.
Figure 11:
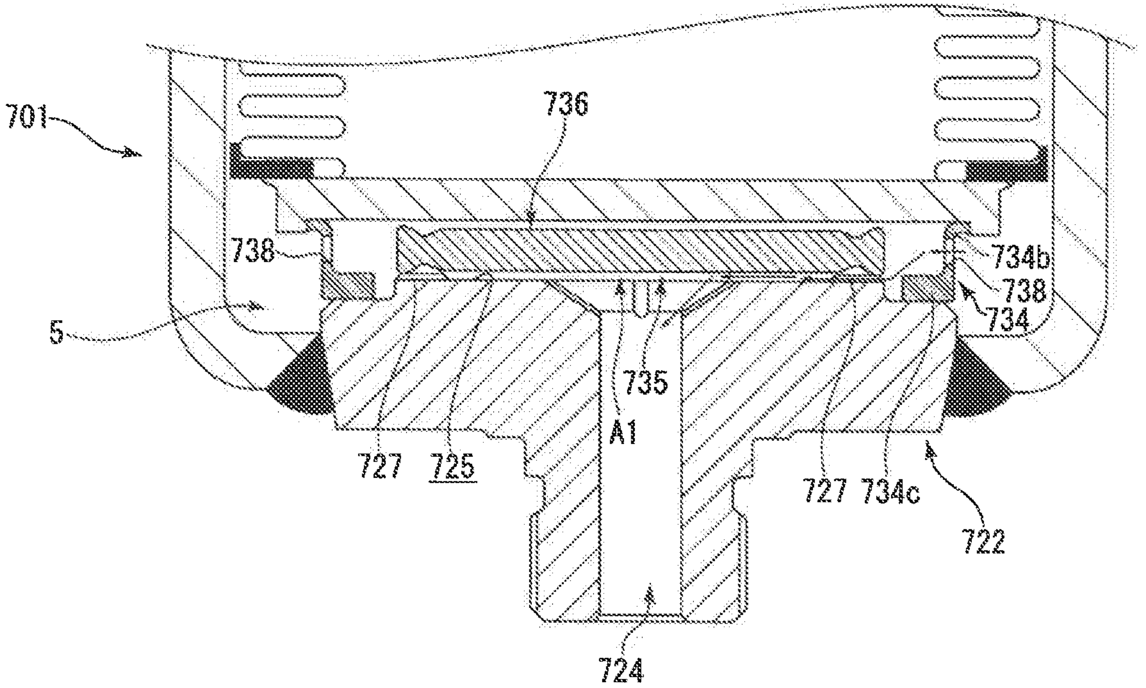

Next, an accumulator according to an eighth embodiment of the present invention will be described with reference to FIG. 11. The same constituent parts as the constituent parts shown in the above embodiments of the present invention will be given the same reference signs, and duplicated description will be omitted.

As shown in FIG. 11A, an accumulator 701 in the eighth embodiment of the present invention includes a plurality of through holes 738, 738, . . . passing through in the radial direction and provided in a tubular portion 734*b* of a seal holder 734 at predetermined intervals in the circumferential direction.

On the outer diameter side of a sealing face 725 of an oil port member 722, communication recess portions 727, 727, . . . extending in the radial direction are formed at predetermined intervals in the circumferential direction corresponding to circumferential positions of the through holes 738, 738, . . . .

An outer diameter of a substrate 736 forming a sealing member 735 is the substantially same size as an outer diameter of the sealing face 725. In other words, the outer diameter of the substrate 736 is smaller than an inner diameter of a holding portion 734*c* of the seal holder 734.

As shown in FIG. 11B, in a state where a rubber-like elastic body 737 of the sealing member 735 is melt and burnt out due to a high temperature of fire, etc. and the exposed substrate 736 is mounted on the communication recess portions 727, 727, . . . provided on the sealing face 725 of the oil port member 722, it is possible to form a pressure releasing flow passage to release the liquid of the liquid chamber 5 flowing in from the through holes 738, 738, . . . which are provided in the tubular portion 734*b* of the seal holder 734 to a fluid inlet/outlet passage 724 from the outer diameter side of the communication recess portions 727, 727, . . . provided on the sealing face 725 of the oil port member 722 through the space A1 formed between the substrate 736 and the sealing face 725, the space communicating with the inner diameter side of the communication recess portions. Thus, there is no need for specifically processing the sealing member 735 and it is possible to extend the life of the accumulator 701. In addition, since it is possible to release the liquid of the liquid chamber 5 to the fluid inlet/outlet passage 724, it is possible to suppress a radical increase in the pressure of the liquid chamber 5 and by extension, the pressure of the gas chamber 4.

Ninth Embodiment

Figure 12:
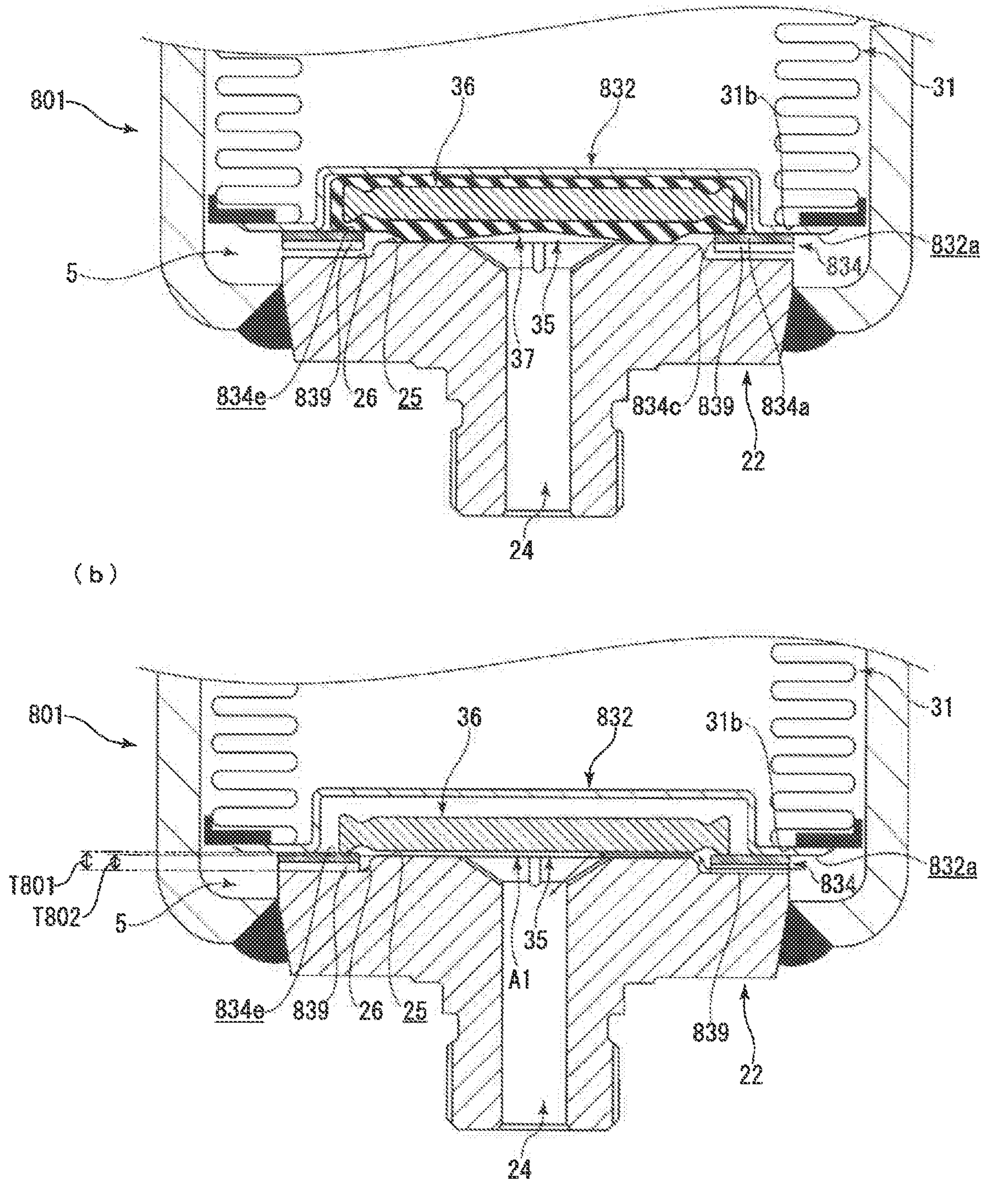
FIG. 12 shows an accumulator according to a ninth embodiment of the present invention.

Next, an accumulator according to a ninth embodiment of the present invention will be described with reference to FIG. 12. The same constituent carts as the constituent parts shown in the above embodiments of the present invention will be given the same reference signs, and duplicated description will be omitted.

As shown in FIG. 12A, an accumulator 801 in the ninth embodiment of the present invention includes a bellows cap 832 projected upward in a sectional view which is welded and fixed so as to close the playing end 31*b* forming the lower end of the bellows main body 31. On an outer diameter side lower face 832*a* of the bellows cap 832, a fixed portion 834*a* of a plate-shaped seal holder 834 is welded and fixed.

The seal holder 834 includes the fixed portion 834*a* forming the outer diameter side, and a holding portion 834*c* forming the inner diameter side. On the lower face side of the seal holder 834, a plurality of communication recess portions 839, 839, . . . extending in the radial direction and provided at predetermined intervals in the circumferential direction.

Height (upper limit size T801) of the seal holder 834 is larger than height (up-down size T802) of a level difference between the sealing face 25 of the oil port member 22 and the annular face portion 26.

As shown in FIG. 12E, in a state where the rubber-like elastic body 37 of the sealing member 35 is melt and burnt out due to a high temperature of fire, etc. and the exposed substrate 36 is mounted on an upper face 834*e* of the holding portion 834*c* of the seal holder 834, it is possible to form a pressure releasing flow passage to release the liquid of the liquid chamber 5 flowing in from the outer diameter side of the communication recess portions 839, 839, . . . which are provided on the lower face side of the seal holder 834 to the fluid inlet/outlet passage 24 through the space A1 formed between the substrate 36 and the sealing face 25, the space communicating with the inner diameter side of the communication recess portions. Thus, there is no need for specifically processing the sealing member 35 and it is possible to extend the life of the accumulator 801. In addition, since it is possible to release the liquid of the liquid chamber 5 to the fluid inlet/outlet passage 24, it is possible to suppress a radical increase in the pressure of the liquid chamber 5, and by extension, the pressure of the gas chamber 4.

Tenth Embodiment

Figure 13:
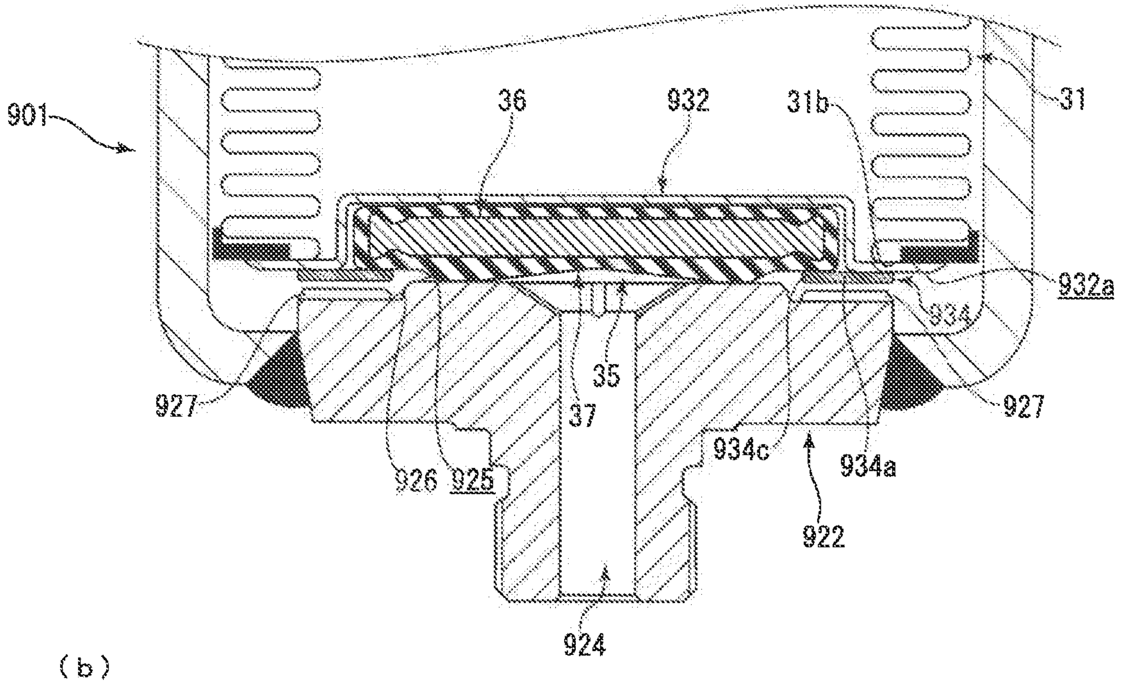
FIG. 13 shows an accumulator in a tenth embodiment.
Figure 13:
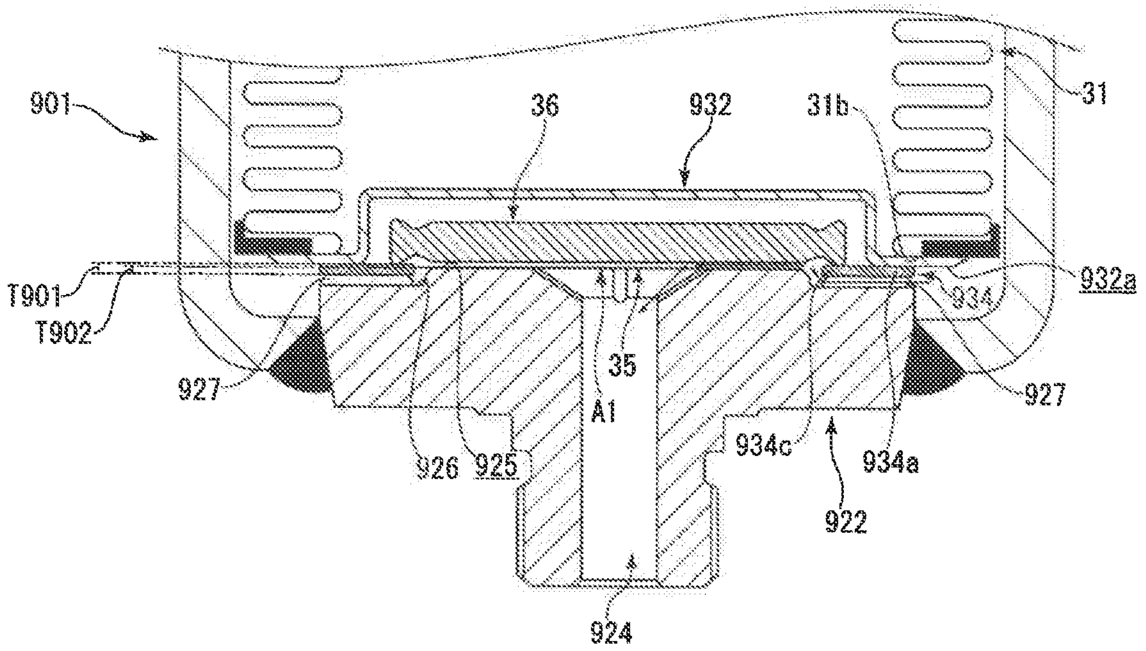

Next, an accumulator according to a tenth embodiment of the present invention will be described with reference to FIG. 13. The same constituent parts as the constituent parts shown in the above embodiments will be given the same reference signs, and duplicated description will be omitted.

As shown in FIG. 13A, in an accumulator 901 in the tenth embodiment of the present invention, a bellows cap 932 projected upward in a sectional view is welded and fixed so as to close the playing end 31*b* forming the lower end of the bellows main body 31. On an outer diameter side lower face 932*a* of the bellows cap 932, a fixed portion 934*a* of a plate-shaped seal holder 934 is welded and fixed.

The seal holder 934 is formed by the fixed portion 934*a* forming the outer diameter side, and a holding portion 934*c* forming the inner diameter side.

In an annular face portion 926 of an oil port member 922, communication recess portions 927, 927, . . . extending in the radial direction are formed at predetermined intervals in the circumferential direction.

Height (upper limit size T901) of the seal holder 934 is larger than height (up-down size T902) between a sealing face 925 of the oil port member 922 and the communication recess portions 927, 927, . . . .

As shown in FIG. 13B, in a state where the rubber-like elastic body 37 of the sealing member 35 is melt and burnt out due to a high temperature of fire, etc. and the exposed substrate 36 is mounted on an upper face 934*e* of the holding portion 934*c* of the seal holder 934, it is possible to form a pressure releasing flow passage to release the liquid of the liquid chamber 5 flowing in from the outer diameter side of the communication recess portions 927, 927, . . . which are provided in the annular face portion 926 of the oil port member 922 to a fluid inlet/outlet passage 924 through the space A1 formed between the substrate 36 and the sealing face 925, the space communicating with the inner diameter side of the communication recess portions. Thus, there is no need for specifically processing the sealing member 35 and it is possible to extend the life of the accumulator 901. In addition, since it is possible to release the liquid of the liquid chamber 5 to the fluid inlet/outlet passage 924, it is possible to suppress a radical increase in the pressure of the liquid chamber 5, and by extension, the pressure of the gas chamber 4.

As above, the embodiments of the present invention are described with the drawings. However, specific configurations are not limited to these embodiments but changes and additions within the range not departing from the gist of the present invention are included in the present invention.

Figure 14:
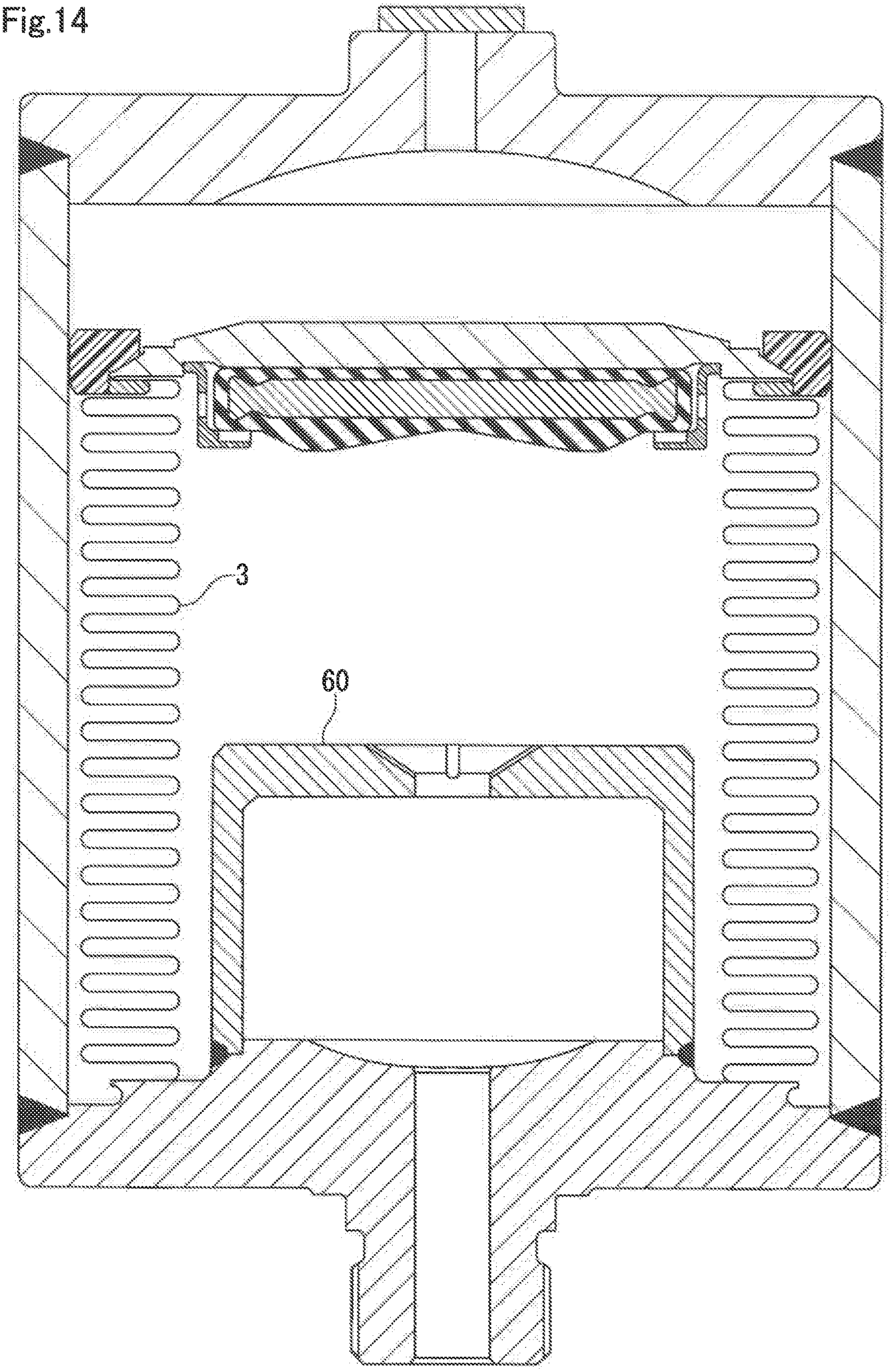
FIG. 14 is a sectional view showing a gas-outside type accumulator according to one of other embodiments of the present invention in which a liquid chamber is set on the inside of a bellows and a gas chamber is set on the outside of the bellows.

For example, in the above embodiments of the present invention, the accumulators 1, 101, 201, 301, 401, 501, 601, 701, 801, 901 are described as the so-called gas-inside type accumulator in which the liquid chamber 5 is set on the outside of the bellows 3 and the gas chamber 4 is set on the inside of the bellows 3. However, the present invention is not limited to this but for example, the accumulators may be a gas-outside type accumulator in which a stay 60, etc. is provided in a bellows 3 to set a liquid chamber on the inside of the bellows and a gas chamber is set on the outside of the bellows (refer to FIG. 14), In the above embodiments, the housing 2 is formed by the cylindrical shell 21, the oil port member 22, 422, 522, 722, or 922 welded and fixed so as to close the lower end of the shell 21, and the gas enclosing member 23 welded and fixed so as to close the upper end of the shell 21. However, the present invention is not limited to this but as long as a gas enclosing port and a fluid inlet/outlet passage are formed in the housing, for example, a shell and an oil port member or a shell and a gas enclosing member may be integrated.

Regarding the communication recess portions provided in the seal holder or the oil port member, a recess portion may be formed by plural projected portions.

The bellows main body 31 is not limited to metal but may be made of, for example, resin, etc.

In the seal holder described in the sixth to eighth embodiments of the present invention, communication recess portions formed by cutting out to the lower end face of the holding portion or the standing portion may be provided as well as the second embodiment, communication recess portions extending in the radial direction may be provided on the lower end face as well as the third embodiment, or communication recess portions formed by cutting out so as to pass through in the radial direction from the holding portion or the standing portion to the vertical portion may be provided as well as the fourth embodiment. Further, in the oil port member described in the sixth to eighth embodiments, communication recess portions extending in the radial direction may be provided in the annular face portion as well as the fifth embodiment.

The substrate 636 descried in the seventh embodiment may be used in the first to sixth and eighth to tenth embodiments. Further, the substrate 36 described in the first embodiment may be used in the seventh embodiment.

The through hole 38 is formed in any shape. However, in order to maintain the flow rate and strength, the through hole is preferably formed in a circular shape or a slit shape elongated in the up and down direction.

The embodiments of the present invention in which the shell 21, the oil port member 22, and the gas enclosing member 23 are formed by respectively different members in the housing 2 are described. However, the shell 21 and the oil port member 22 or the gas enclosing member 23 may be a single member.

REFERENCE SIGNS LIST

1 Accumulator
2 Housing
3 Bellows
4 Gas chamber
5 Liquid chamber
21 Shell
22 Oil port member
23 Gas enclosing member
24 Fluid inlet/outlet passage
24*a* Opening portion
24*b* Groove portion
25 Sealing face
26 Annular face portion
31 Bellows main body
32 Bellows cap
34 Seal holder
34*b* Tubular portion
34*c* Holding portion
35 Sealing member
36 Substrate
37 Rubber-like elastic body
38 Through hole
39 Communication recess portion (communication passage)

534*c* Standing portion
S Sealing portion
A1 Space
R1, R2 Radius
T1, T2 Up-down size

The invention claimed is:

1. An accumulator comprising:

a housing having a sealing face and a fluid inlet/outlet passage;

a bellows fixed at least one end to the housing such that an inner space of the housing is hermetically partitioned by the bellows into an interior and an exterior of the bellows, the bellows including a bellows main body capable of expanding and contracting and a bellows cap including an annular seal holder;

a sealing member formed by covering a disc-shaped substrate with an elastic body that is opposed to and capable of being closely attached to the sealing face of the housing, and an annular seal holder fixed to the bellows cap and provided with a holding portion for holding the sealing member on an inner diameter side of the annular seal holder, the fluid inlet/outlet passage of the housing being closed upon a close attachment of the elastic body to the sealing face, wherein the accumulator further comprises a pressure releasing flow passage in the form of a through hole passing through in a radial direction is provided in the seal holder, and a communication passage extending in the radial direction so as to partially form a space providing communication between the through hole and the fluid inlet/outlet passage is provided in the seal holder or the sealing face, wherein when the elastic body is melted and burnt out, the through hole and the communication passage cooperatively supply fluid from an outside of the seal holder to a contact portion between the disc-shaped substrate and the sealing face of the housing.

2. The accumulator according to claim 1, wherein a plurality of the through holes and a plurality of the communication passages are provided in the circumferential direction.

3. The accumulator according to claim 2, wherein the through hole and the communication passage are aligned in the radial direction.

4. The accumulator according to claim 2, wherein the substrate has a diameter larger than an inner diameter of the holding portion of the seal holder, and the communication passage is a communication recess portion provided on an upper face of the holding portion of the seal holder and, extending more than the substrate outward in the radial direction.

5. The accumulator according to claim 2, wherein the substrate has a diameter smaller than an inner diameter of the holding portion of the seal holder, and the communication passage is a communication recess portion provided on the sealing face.

6. The accumulator according to claim 5, wherein a sealing portion where the sealing member and the sealing face are closely attached to each other is formed on a radially inward side of the communication recess portion.

7. The accumulator according to claim 2, wherein the seal holder is formed in an upward substantially-U shape in a sectional view, and having a standing portion on the radially inward side of the substantially-U shape that holds the sealing member, the substrate has a diameter larger than an inner diameter of the standing portion of the seal holder, and the communication passage is a communication hole passing through the standing portion of the seal holder in the radial direction.

8. The accumulator according to claim 2, wherein the fluid inlet/outlet passage has an opening portion formed in a funnel shape gradually spreading toward an open end thereof.

9. The accumulator according to claim 8, wherein a groove portion extending along an inclined portion of the funnel shape of the fluid inlet/outlet passage is provided.

10. The accumulator according to claim 1, wherein the through hole and the communication passage are aligned in the radial direction.

11. The accumulator according to claim 10, wherein the substrate has a diameter larger than an inner diameter of the holding portion of the seal holder, and the communication passage is a communication recess portion provided on an upper face of the holding portion of the seal holder and, extending more than the substrate outward in the radial direction.

12. The accumulator according to claim 10, wherein the substrate has a diameter smaller than an inner diameter of the holding portion of the seal holder, and the communication passage is a communication recess portion provided on the sealing face.

13. The accumulator according to claim 12, wherein a sealing portion where the sealing member and the sealing face are closely attached to each other is formed on a radially inward side of the communication recess portion.

14. The accumulator according to claim 10, wherein the seal holder is formed in an upward substantially-U shape in a sectional view, and having a standing portion on the radially inward side of the substantially-U shape that holds the sealing member, the substrate has a diameter larger than an inner diameter of the standing portion of the seal holder, and the communication passage is a communication hole passing through the standing portion of the seal holder in the radial direction.

15. The accumulator according to claim 1, wherein the substrate has a diameter larger than an inner diameter of the holding portion of the seal holder, and the communication passage is a communication recess portion provided on an upper face of the holding portion of the seal holder and, extending more than the substrate outward in the radial direction.

16. The accumulator according to claim 1, wherein the substrate has a diameter smaller than an inner diameter of the holding portion of the seal holder, and the communication passage is a communication recess portion provided on the sealing face.

17. The accumulator according to claim 16, wherein a sealing portion where the sealing member and the sealing face are closely attached to each other is formed on a radially inward side of the communication recess portion.

18. The accumulator according to claim 1, wherein the seal holder is formed in an upward substantially-U shape in a sectional view, and having a standing portion on the radially inward side of the substantially-U shape that holds the sealing member, the substrate has a diameter larger than an inner diameter of the standing portion of the seal holder, and the communication passage is a communication hole passing through the standing portion of the seal holder in the radial direction.

19. The accumulator according to claim 1, wherein the fluid inlet/outlet passage has an opening portion formed in a funnel shape gradually spreading toward an open end thereof.

20. The accumulator according to claim 19, wherein a groove portion extending along an inclined portion of the funnel shape of the fluid inlet/outlet passage is provided.

* * * * *